(12) United States Patent
Jo et al.

(10) Patent No.: US 11,125,117 B2
(45) Date of Patent: Sep. 21, 2021

(54) APPARATUS FOR TREATING EXHAUST GAS OF THERMAL PLANT

(71) Applicant: EMKO CO., LTD., Seoul (KR)

(72) Inventors: Han-Jae Jo, Hwaseong-si (KR); Seung Jae Lee, Seoul (KR)

(73) Assignee: EMKO CO., LTD., Seoul (KR)

( * ) Notice: Subject to any disclaimer, the term of this patent is extended or adjusted under 35 U.S.C. 154(b) by 36 days.

(21) Appl. No.: 16/740,801

(22) Filed: Jan. 13, 2020

(65) Prior Publication Data
US 2020/0378275 A1    Dec. 3, 2020

(30) Foreign Application Priority Data

May 31, 2019    (KR) .......................... 10-2019-0064906

(51) Int. Cl.
*F01D 25/30*    (2006.01)
*B01D 53/94*    (2006.01)
(Continued)

(52) U.S. Cl.
CPC ....... *F01D 25/305* (2013.01); *B01D 53/9431* (2013.01); *B01F 3/04049* (2013.01);
(Continued)

(58) Field of Classification Search
CPC .... B01D 2251/2062; B01D 2255/1021; B01D 2255/20723; B01D 2255/20738; B01D 2255/20761; B01D 2255/50; B01D 2255/502; B01D 2255/904; B01D 2258/018; B01D 53/8625; B01D 53/8631; B01D 53/9431; B01F 3/04049;
(Continued)

(56) References Cited

U.S. PATENT DOCUMENTS 7,814,745 B2 *    10/2010    Levin .................. B01F 3/04049
                                                        60/286
8,033,714 B2 *    10/2011    Nishioka ................. F23D 14/64
                                                        366/163.2
(Continued)

FOREIGN PATENT DOCUMENTS

CN        109715913 A    5/2019
JP        2013-139802 A    7/2013
(Continued)

*Primary Examiner* — Jesse S Bogue
(74) *Attorney, Agent, or Firm* — Novick, Kim & Lee, PLLC; Jae Youn Kim

(57) ABSTRACT

An apparatus for treating exhaust gas of a thermal power plant according to the present invention includes: a diffusion module part controlling an exhaust gas flow between a duct disposed at a rear end of a gas turbine of the thermal power plant and the gas turbine to guide the exhaust gas flow toward an inner wall of the duct; a plurality of injection nozzles installed in a flow section in the duct in which the exhaust gas guided toward the inner wall of the duct from the diffusion module part flows, and protruding from the inner wall of the duct; a fluid supply pipe connected to the injection nozzles and extending outside the duct; a fluid supply part supplying a pollutant treatment fluid in liquid phase to the injection nozzles through the fluid supply pipe; and a catalyst module disposed at rear ends of the injection nozzles.

15 Claims, 12 Drawing Sheets

(51) Int. Cl.
  *B01F 3/04* (2006.01)
  *B01F 5/04* (2006.01)
(52) U.S. Cl.
  CPC .......... *B01F 5/0475* (2013.01); *B01F 5/0486* (2013.01); *B01D 2255/1021* (2013.01); *B01D 2255/20723* (2013.01); *B01D 2255/20738* (2013.01); *B01D 2255/502* (2013.01); *F05D 2220/32* (2013.01)
(58) Field of Classification Search
  CPC ...... B01F 5/0475; B01F 5/048; B01F 5/0486; B01F 5/0471; F01D 25/305; F05D 2220/32; F05D 2270/08
  See application file for complete search history.

(56) References Cited

U.S. PATENT DOCUMENTS

| | | | | |
|---|---|---|---|---|
| 8,745,978 | B2 * | 6/2014 | Vanvolsem | B01D 53/90 60/324 |
| 9,291,177 | B2 * | 3/2016 | Wurz | F15D 1/001 |
| 10,092,886 | B2 * | 10/2018 | Kashihara | B01F 5/0659 |
| 10,138,789 | B1 * | 11/2018 | Mishra | B01F 3/04049 |
| 10,166,515 | B2 * | 1/2019 | Pels | B01F 3/0865 |
| 10,883,387 | B2 * | 1/2021 | Zhang | F02C 7/141 |
| 2005/0056313 | A1 * | 3/2005 | Hagen | B01F 5/0453 137/3 |
| 2012/0096838 | A1 * | 4/2012 | Sandberg | B01F 5/0463 60/274 |
| 2014/0094109 | A1 | 4/2014 | Chang | |
| 2016/0237870 | A1 * | 8/2016 | Yokoyama | F01N 3/2892 |
| 2018/0058698 | A1 * | 3/2018 | Czarnecki | F02C 3/32 |

FOREIGN PATENT DOCUMENTS

| | | |
|---|---|---|
| KR | 10-1449244 B1 | 10/2014 |
| KR | 10-1563079 B1 | 10/2015 |
| KR | 10-2016-0116671 A | 10/2016 |
| KR | 10-1807996 B1 | 12/2017 |
| KR | 10-2018-0071384 A | 6/2018 |
| KR | 10-1876413 B1 | 7/2018 |
| KR | 10-1910874 B1 | 10/2018 |

* cited by examiner

APPARATUS FOR TREATING EXHAUST GAS OF THERMAL PLANT

CROSS REFERENCE TO RELATED APPLICATION

The present application claims priority to Korean Patent Application No. 10-2019-0064906, filed May 31, 2019, the entire contents of which is incorporated herein for all purposes by this reference.

BACKGROUND OF THE INVENTION

Field of the Invention

The present invention relates generally to an apparatus for treating exhaust gas and, more particularly, to an apparatus for treating exhaust gas of a thermal power plant.

Description of the Related Art

Electric power is generally produced in large-scale power plants. In power plants, power generation methods such as thermal power generation generating power by burning fuels, nuclear power generation using nuclear energy, hydroelectric power generation using falling of fluid, and the like are used. In other power generation facilities, power generation methods using solar power, tidal power, wind power, and the like are used.

Of these, thermal power generation, which is a power generation method that is still being actively used, is a method that involves burning fuel to drive a turbine. In order to produce electric power by thermal power generation, fuels have to be continually consumed. The fuels are burned in a gas turbine and generate a large amount of exhaust gas. This exhaust gas contains pollutants generated by combustion reaction and high temperature thermal reaction of fuels, and thus special treatment is required.

Therefore, various types of treatment facilities have been applied to thermal power plants (e.g., Korean Patent No. 10-1563079, and the like). However, treatment facilities in the related art do not satisfactorily treat exhaust gas. In particular, in thermal power plants, an operating state of a turbine changes frequently, and conditions such as flow rate, speed, and temperature of exhaust gas may be changed thereby. The conditions may be changed particularly rapidly during startup, which requires a technical response to this. However, development of satisfactory treatment technology is still insufficient.

The foregoing is intended merely to aid in the understanding of the background of the present invention, and is not intended to mean that the present invention falls within the purview of the related art that is already known to those skilled in the art.

DOCUMENTS OF RELATED ART (Patent document 1) Korean Patent No. 10-1563079 (published on 2015 Oct. 30)

SUMMARY OF THE INVENTION

Accordingly, the present invention has been made keeping in mind the above problems occurring in the related art, and an objective of the present invention is to provide an apparatus for treating exhaust gas of a thermal power plant, and in particular, to provide an apparatus for treating exhaust gas of a thermal power plant, the apparatus being capable of efficiently treating exhaust gas even during startup of the thermal power plant.

Objectives of the present invention are not limited to the above-mentioned objective, and other objectives that are not mentioned will be clearly understood by those skilled in the art from the following description.

In order to achieve the above objective, according to one aspect of the present invention, there is provided an apparatus for treating exhaust gas of a thermal power plant, the apparatus including: a diffusion module part controlling an exhaust gas flow between a duct disposed at a rear end of a gas turbine of the thermal power plant and the gas turbine to guide the exhaust gas flow toward an inner wall of the duct; a plurality of injection nozzles installed in a flow section in the duct in which the exhaust gas guided toward the inner wall of the duct from the diffusion module part flows, and protruding from the inner wall of the duct; a fluid supply pipe connected to the injection nozzles and extending outside the duct; a fluid supply part supplying a pollutant treatment fluid in liquid phase to the injection nozzles through the fluid supply pipe; and a catalyst module disposed at rear ends of the injection nozzles, wherein the diffusion module part includes an outer cylinder through which the exhaust gas passes, and a hub inserted into a center of the outer cylinder and guiding the exhaust gas in a centrifugal direction, and the injection nozzles do not intersect an extension line extending from an outer circumferential surface of the hub in a longitudinal direction of the hub.

The apparatus may further include a flow control member provided at the hub, and guiding a flow direction of the exhaust gas toward the inner wall of the duct.

Ends of the injection nozzles may be spaced apart from the inner wall of the duct, along a perpendicular line that extends to the inner wall of the duct from the extension line extending parallel from the outer circumferential surface of the hub in the longitudinal direction of the hub, by equal to or less than ⅚ of a length of the perpendicular line.

The injection nozzles may be spaced apart from an intersection point of a first extension line that extends parallel to the longitudinal direction of the duct from the inner wall of the duct and a second extension line that extends from an end of the hub and intersects the first extension line perpendicularly, along the first extension line, by equal to or less than ⅞ of a lineal distance defined between the hub and a duct expansion pipe connected to a rear end of the duct.

The catalyst module may include a selective catalytic reduction catalyst.

The selective catalytic reduction catalyst may include a zeolite-based selective catalytic reduction catalyst.

The zeolite-based selective catalytic reduction catalyst may include at least one selected from an iron-zeolite-based selective catalytic reduction catalyst and a copper-zeolite-based selective catalytic reduction catalyst.

The apparatus may further include a heat exchange module disposed at the rear ends of the injection nozzles, wherein the catalyst module may be disposed between the injection nozzles and an exhaust gas discharge side end of the heat exchange module.

The heat exchange module may include a first heat exchange module and a second heat exchange module, wherein the first heat exchange module may be disposed between the injection nozzles and the second heat exchange module, and the catalyst module may be disposed between the first and second heat exchange modules or between the injection nozzles and the first heat exchange module.

The apparatus may further include an additional catalyst module disposed at a rear end of the catalyst module.

The additional catalyst module may include at least one selected from a metal oxide selective catalytic reduction catalyst and an oxidation catalyst.

The apparatus may further include a heat exchange module disposed at the rear ends of the injection nozzles, wherein the heat exchange module may include a first heat exchange module and a second heat exchange module, the first heat exchange module may be disposed between the injection nozzles and the second heat exchange module, the catalyst module may be disposed between the first and second heat exchange modules or between the injection nozzles and the first heat exchange module, and the additional catalyst module may be disposed at a rear end of the second heat exchange module.

The heat exchange module may further include a third heat exchange module disposed at the rear end of the second heat exchange module, and the additional catalyst module may be disposed at a rear end of the third heat exchange module.

A gas-phase fluid injection part injecting a pollutant treatment fluid in gas phase may be disposed between the second and third heat exchange modules.

The additional catalyst module may include a first additional catalyst module including a metal oxide selective catalytic reduction catalyst and a second additional catalyst module including an oxidation catalyst, and the second additional catalyst module may be disposed at a rear end of the first additional catalyst module.

The present invention can treat the exhaust gas of the thermal power plant very effectively and efficiently. In particular, the present invention can exhibit an excellent treatment effect on exhaust gas generated and discharged from a combined cycle power plant, and can exhibit an excellent treatment effect even during startup of the combined cycle power plant.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

The advantages, features, and methods for achieving those of embodiments may become apparent upon referring to embodiments described later in detail together with the accompanying drawings. However, the embodiments are not limited to the embodiments disclosed hereinafter, but may be embodied in different modes. The embodiments are provided for completeness of the disclosure and to inform the scope thereof to those ordinarily skilled in the art. In addition, the scope of the present invention is defined only by the accompanying claims. The same reference numbers may refer to the same or like elements throughout the specification.

Hereinafter, an apparatus for treating exhaust gas in a thermal power plant (hereinafter, referred to as an apparatus for treating exhaust gas) according to an embodiment of the present invention will be described in detail with reference to FIGS. 1 to 9.

Figure 1:
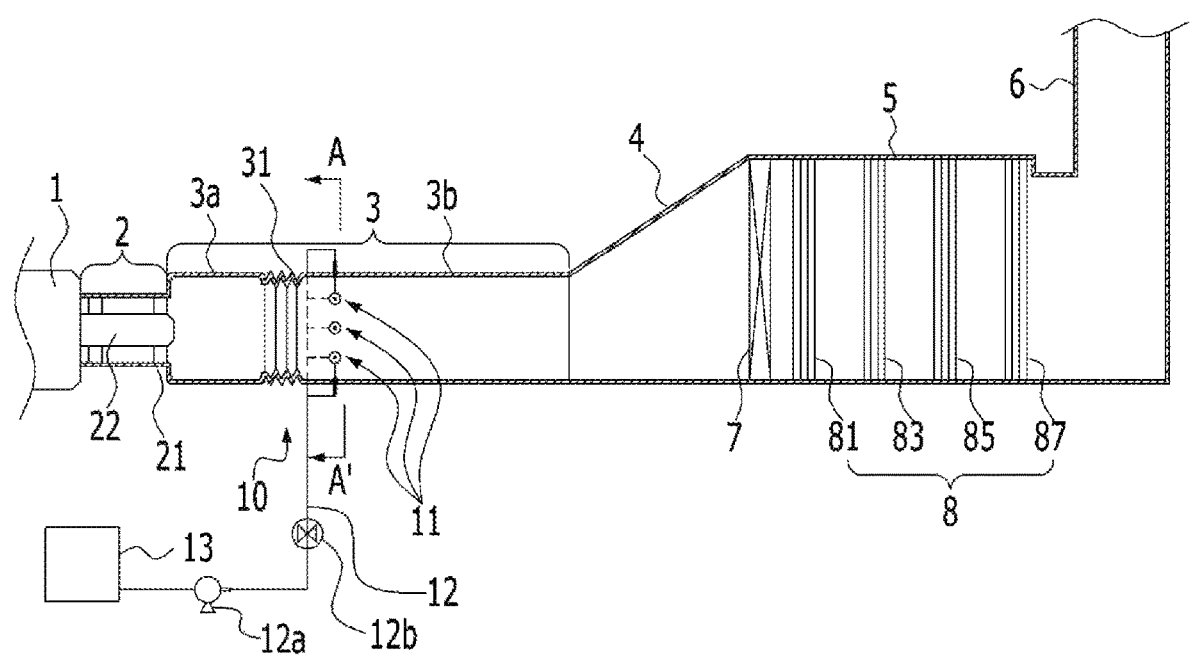
FIG. 1 is a view showing an arrangement structure of an apparatus for treating exhaust gas in a thermal power plant according to an embodiment of the present invention.
Figure 2:
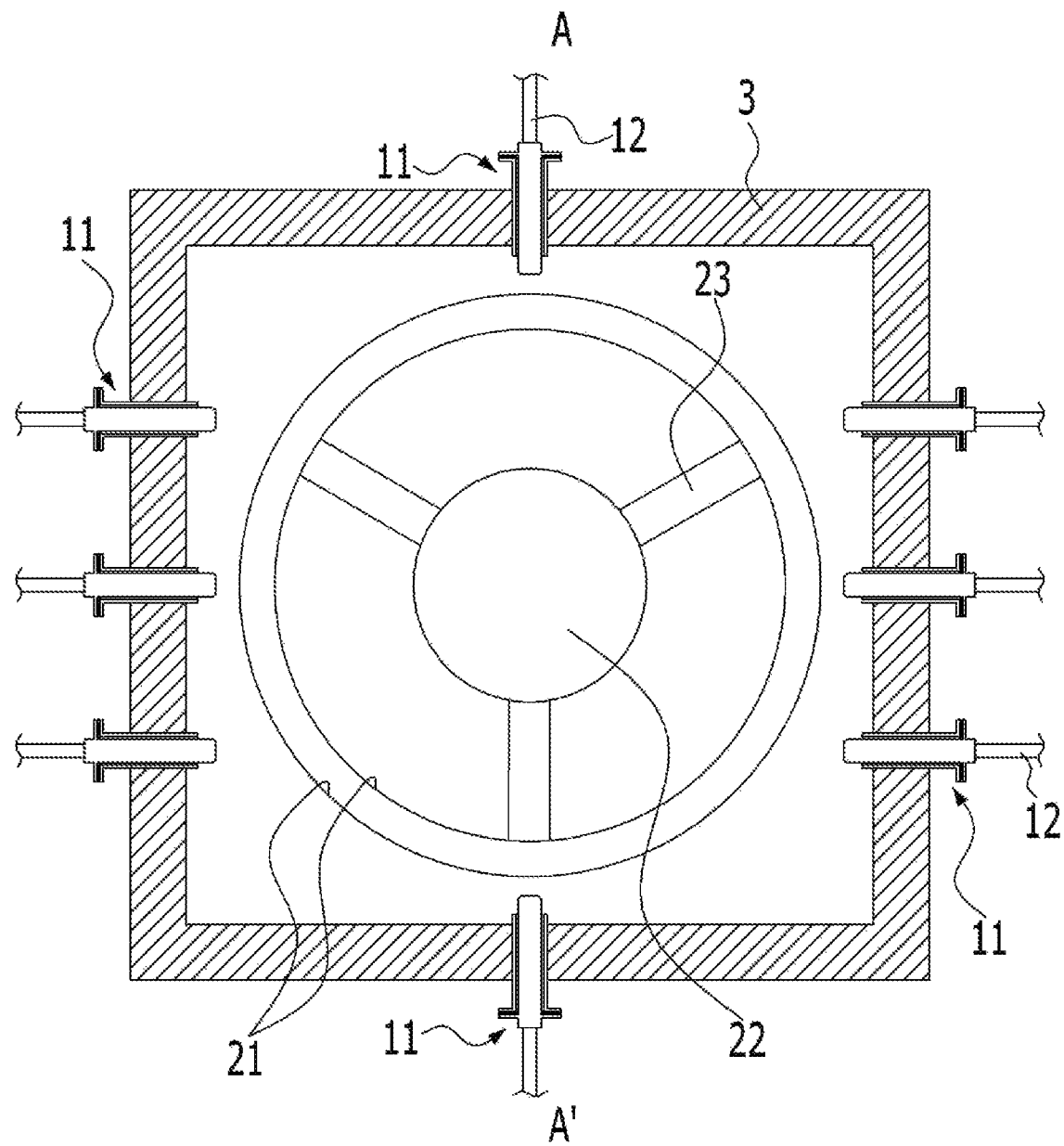
FIG. 2 is a sectional view taken along line A-A' of a duct portion in which injection nozzles of the apparatus for treating exhaust gas of FIG. 1 are installed.
Figure 3A:
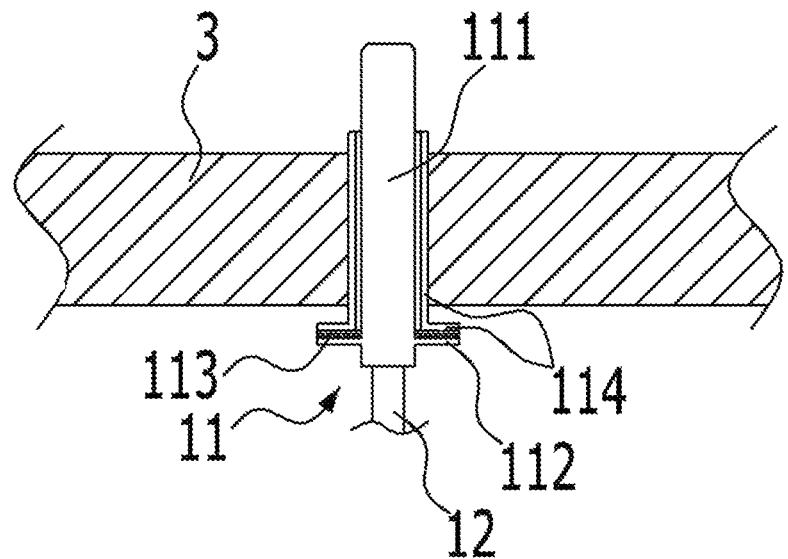
FIGS. 3A and 3B are enlarged views showing an installation structure of the injection nozzles of FIG. 2.
Figure 3B:
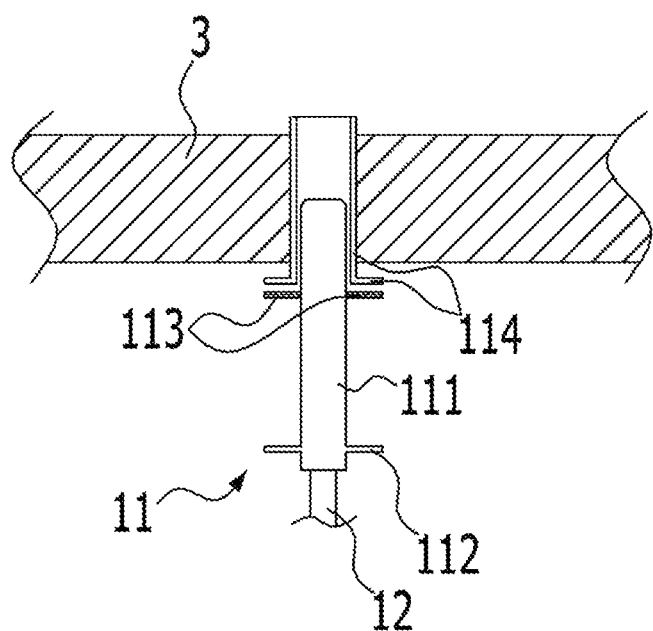
Figure 4:
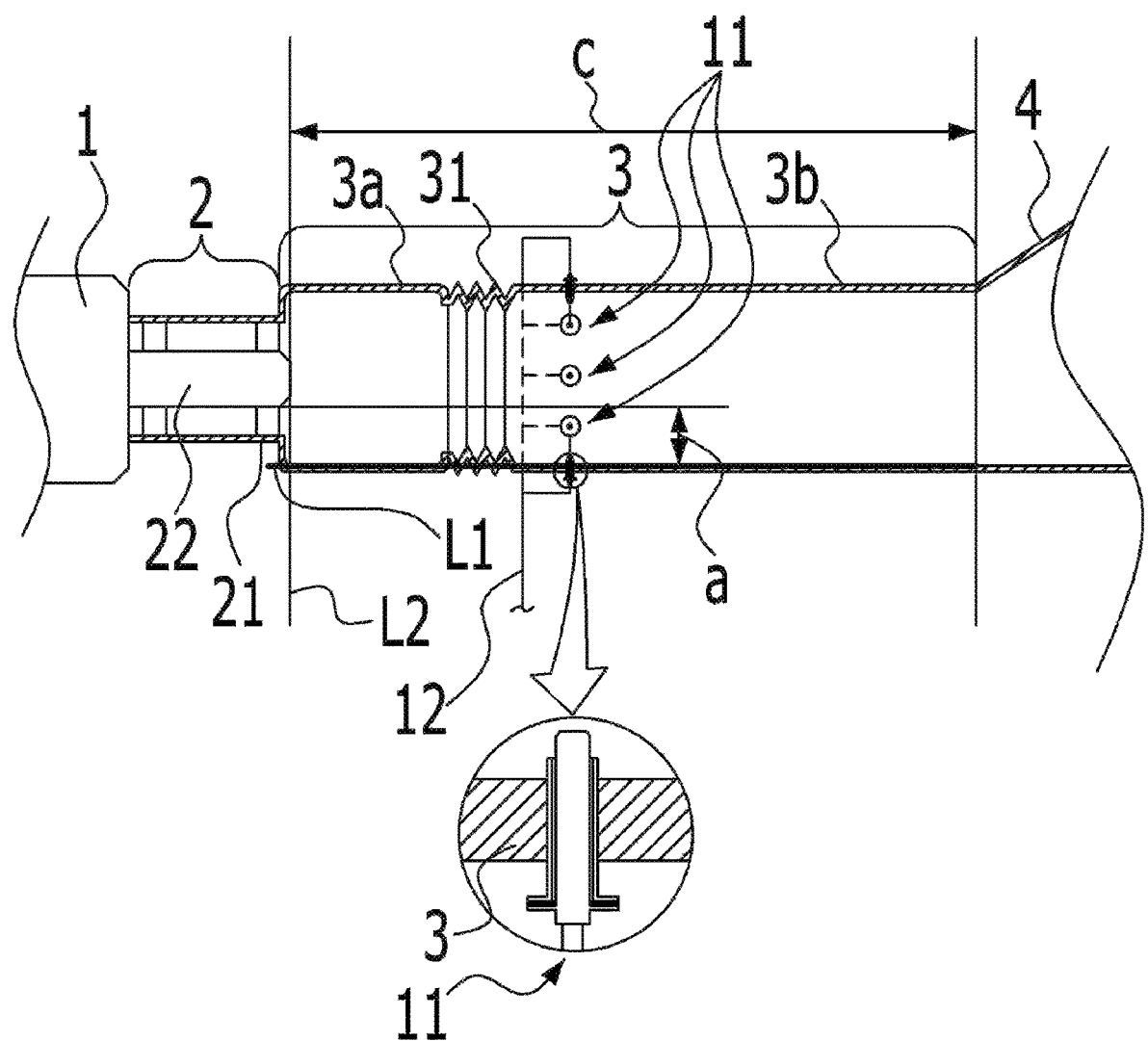
FIG. 4 is an enlarged partial view showing a part of the arrangement structure of FIG. 1.

FIG. 1 is a view showing an arrangement structure of an apparatus for treating exhaust gas in a thermal power plant according to an embodiment of the present invention, FIG. 2 is a sectional view taken along line A-A' of a duct portion in which injection nozzles of the apparatus for treating exhaust gas of FIG. 1 are installed, FIGS. 3A and 3B are enlarged views showing an installation structure of the injection nozzles of FIG. 2, and FIG. 4 is an enlarged partial view showing a part of the arrangement structure of FIG. 1;

Referring to FIGS. 1 to 4, the apparatus 10 for treating exhaust gas according to the present invention is configured to effectively treat exhaust gas using the flow of the exhaust gas of a thermal power plant. The apparatus 10 for treating exhaust gas according to the present invention is configured to guide the flow of the exhaust gas toward an inner wall of a duct 3 through a diffusion module part 2 connected to a gas turbine 1. An injection nozzle 11 does not require a grid-like structure that is installed inside a space in which the exhaust gas flows, but protrudes directly from the inner wall of the duct 3, thus being able to easily inject a pollutant treatment fluid into the exhaust gas without disturbing the flow of the exhaust gas in the duct 3.

In particular, the area of the inner wall of the duct 3 in which the injection nozzle 11 is disposed is an area where an exhaust gas flow guided in a centrifugal direction is formed and maintained by the diffusion module part 2, which is an area where the exhaust gas in the duct 3 is distributed at a relatively high concentration. Therefore, by intensively injecting the pollutant treatment fluid into the exhaust gas through the injection nozzle 11 disposed in such an area, the fluid can be brought into contact with pollutants in the exhaust gas more effectively. This enables the pollutants to reach the surface of a catalyst included in a catalyst module 7 in a state of being in sufficient contact with the pollutant treatment fluid, whereby the pollutants can be more easily treated by catalysis. As a result of intensively injecting the pollutant treatment fluid at a specific point in consideration of the exhaust gas flow such that the fluid reaches the catalyst surface in sufficient contact with the pollutants in the exhaust gas and catalysis takes place, the efficiency of treating the pollutants in the entire exhaust gas can be greatly increased.

Such a treatment structure can exhibit a very excellent treatment effect by intensively injecting the pollutant treatment fluid into the exhaust gas of which the temperature has not yet risen sufficiently at the time of starting the gas turbine 1, and can be applied particularly effectively to a combined cycle power plant in which the gas turbine 1 changes in operating state frequently and is started relatively frequently. That is, the exhaust gas which is an object to be treated by the present invention may preferably be exhaust gas of the combined cycle power plant, and the present invention can be useful for treatment of exhaust gas that is generated when the gas turbine 1 of the combined cycle power plant is started. In particular, causative substances (e.g., nitrogen dioxide) which are conventionally contained in the exhaust gas during initial startup to produce yellow gas can also be treated very effectively using the treatment structure of the present invention. Therefore, the present invention can be very useful for removing yellow gas and the like of the combined cycle power plant.

The apparatus 10 for treating exhaust gas according to the embodiment of the present invention is specifically configured as follows. The apparatus 10 for treating exhaust gas includes: a diffusion module part 2 controlling an exhaust gas flow between a duct 3 disposed at a rear end of a gas turbine 1 of a thermal power plant and the gas turbine 1 to guide the exhaust gas flow toward the inner wall of the duct 3; a plurality of injection nozzles 11 installed in a flow section in the duct 3 in which the exhaust gas guided toward the inner wall of the duct 3 from the diffusion module part 2 flows, and protruding from the inner wall of the duct 3; a fluid supply pipe 12 connected to the injection nozzles 11 and extending outside the duct 3; a fluid supply part 13 supplying a pollutant treatment fluid in liquid phase to the injection nozzles 11 through the fluid supply pipe 12; and a catalyst module 7 disposed at rear ends of the injection nozzles 11. Hereinafter, a specific arrangement structure of the apparatus 10 for treating exhaust gas, features of each component, and the like will be described in more detail with reference to the drawings.

First, an arrangement relationship between a gas exhaust structure composed of the gas turbine 1, the duct 3, a duct expansion pipe 4, and a stack 6 and the diffusion module part 2 will be described. Hereinafter, the terms "front end and rear end" are referred to as relative positions with respect to an exhaust gas flow direction. In FIG. 1, the exhaust gas flows horizontally to the right, and thus an end of each component toward the right on the drawings may be a rear end. Referring to FIG. 1 in detail, the gas turbine 1 rotates a turbine by burning fuel and discharges exhaust gas generated during combustion to the rear end. The gas turbine 1, which is a rotary heat engine that starts a turbine with a combustion gas of high temperature and high pressure, generally includes a compressor, a combustor, and a turbine. The duct 3 is disposed at the rear end of the gas turbine 1. The duct 3 may be located at the rear end of the gas turbine 1 but may not be directly connected to the gas turbine 1. The diffusion module part 2 may be provided between the gas turbine 1 and the duct 3. The diffusion module part 2 may receive the exhaust gas discharged from the gas turbine 1, control the pressure of the exhaust gas, and diffuse and discharge the exhaust gas to the duct 3. The diffusion module part 2 may add a centrifugal velocity component to the exhaust gas while the exhaust gas passes through the diffusion module part 2, thereby allowing the exhaust gas to be guided toward the inner wall of the duct 3 located at the rear end of the diffusion module part 2.

The duct expansion pipe 4 is connected to the rear end of the duct 3. The duct expansion pipe 4 is a funnel-shaped structure that gradually increases in width and is connected at a rear end to an exhaust heat recovery boiler part 5. The exhaust heat recovery boiler part 5 includes an exhaust gas flow path that has a larger width than the duct 3 and may include therein a heat exchange module 8 installed for recovering thermal energy of the exhaust gas. The heat exchange module 8 may include a pipe through which a heat exchange fluid such as water flows to exchange heat of the exhaust gas, and may be comprised of a plurality of sub-heat exchange modules. That is, for example, the heat exchange module 8 may include sub-heat exchange modules such as a first heat exchange module 81, a second heat exchange module 83, a third heat exchange module 85, and a fourth heat exchange module 87. Although only the first to fourth heat exchange modules are shown in FIG. 1, a fifth heat exchange module and a sixth heat exchange module may be additionally included in the heat exchange module. The heat exchange module 8 may include a superheater bundle, and each of the sub-heat exchange modules may also include a superheater bundle. Although not shown in the drawings, upper and lower ends of the respective sub-heat exchange modules may be connected to each other, and a connection portion may be provided with a tank for storing and circulating high pressure steam or a heat exchange fluid. The sub-heat exchange modules may circulate a fluid sequentially from a rear end module (e.g., the fourth heat exchange module) toward a front end module (e.g., the first heat exchange module) and generate the high pressure steam and the like. The temperature of the sub-heat exchange modules may be lowered sequentially from the front end module (e.g., the first heat exchange module) toward the rear end module (e.g., the fourth heat exchange module).

The stack 6 extending vertically is connected to a rear end of the exhaust heat recovery boiler part 5 such that the exhaust gas is finally discharged through the stack 6.

The injection nozzles 11 are installed in the flow section in the duct 3 in which the exhaust gas guided from the diffusion module part 2 toward the inner wall of the duct 3 flows. As described above, the diffusion module part 2 receives the exhaust gas, controls the pressure of the exhaust gas, and diffuses and discharges the exhaust gas. In this process, the exhaust gas obtains the centrifugal velocity component and is guided toward the inner wall of the duct 3 located at the rear end. Since the injection nozzles 11 protrude directly from the inner wall of the duct 3, the pollutant treatment fluid can be directly injected into the exhaust gas flow of high concentration which is guided toward the inner wall of the duct 3, thereby being brought into contact with the pollutants in the exhaust gas more effectively. The flow section refers to a space in which the exhaust gas guided by the diffusion module part 2 toward the inner wall of the duct 3 flows. However, the present invention is not limited thereto. For example, the flow section may be a space defined between the inner wall of the duct 3 and an extension line extending from the outer circumferential surface of a hub 22, which will be described later, in parallel in a longitudinal direction of the hub 22. More preferably, the flow section may be spaced apart from the inner wall of the duct 3 along a perpendicular line a (see FIG. 4) by equal to or less than 5/8 of the length of the perpendicular line a, and may be spaced apart from an intersection point of a first extension line (see L1 of FIG. 4) and a second extension line (see L2 of FIG. 4) along the first extension line by equal to or less than 7/8 of a lineal distance c (see FIG. 4). The perpendicular line extends to the inner wall of the duct 3 from the extension line extending parallel from the outer circumferential surface of the hub 22 in the longitudinal direction of the hub 22, the first extension line extends parallel to the longitudinal direction of the duct 3 from the inner wall of the duct 3, the second extension line extends from an end of the hub 22 and intersects the first extension line perpendicularly, and the lineal distance is defined between the hub 22 and the duct expansion pipe connected to the rear end of the duct 3.

The diffusion module part 2 has a structure that includes an outer cylinder 21 through which the exhaust gas passes, and the hub 22 inserted into the center of the outer cylinder 21 and guiding the exhaust gas in a centrifugal direction, such that the exhaust gas flow guided toward the inner wall of the duct 3 can be formed more easily. The outer cylinder 21 may have a circular cross-section. The hub 22 in the center of the outer cylinder 21 functions as a kind of resistor to the exhaust gas and changes the flow direction of the exhaust gas to outwardly of the hub 22, and thus the centrifugal velocity component can be further added to the exhaust gas passing through the hub 22. The length, diameter, and the like of the hub 22 may be changed if necessary. The hub 22 may be fixed to the outer cylinder 21 by being connected to a support 23.

The duct 3 may be configured as a pipe between the diffusion module part 2 and the duct expansion pipe 4, and may include a buffer connection portion 31 provided at one side thereof to buffer vibration. The injection nozzles 11 may be located at the rear end of the buffer connection portion 31. For example, as shown in the drawings, the duct 3 may be a structure comprised of a first duct portion 3a, a second duct portion 3b, and the buffer connection portion 31 between the first and second duct portions 3a and 3b such that the buffer connection portion 31 absorbs vibration to prevent propagation of the vibration to the rear end. Since the injections nozzle 11 are located at the rear end of the buffer connection portion 31, the injection nozzles 11 can inject the pollutant treatment fluid into the exhaust gas more efficiently at a normal position while minimizing influence of mechanical vibration of the gas turbine 1. However, the present invention is not necessarily limited thereto, and the injection nozzles 11 may be installed at any positions in the duct 3, regardless of the front end or the rear end of the buffer connection portion 31. However, in the present embodiment will be described an example disposed at the rear end of the buffer connection portion 31, but is not necessarily limited as such. The buffer connection portion 31 may include various types of shock absorbers and may include, for example, a structure such as a corrugated pipe that absorbs vibration, such as a bellows. The size of the first duct portion 3a and the second duct portion 3b is not fixed, and the size or arrangement may be appropriately changed depending on the position or arrangement of the buffer connection portion 31. For example, the buffer connection portion 31 may be disposed at a position closer to the gas turbine 1, such that the first duct portion 3a may be shorter in length than the second duct portion 3b.

The fluid supply pipe 12 is connected to the injection nozzles 11 and extends outside the duct 3. The fluid supply pipe 12 may be structured in various shapes capable of supplying the pollutant treatment fluid from a fluid supply structure outside the duct 3 to the injection nozzles 11 coupled to the duct 3. Therefore, a formation method of the fluid supply pipe 12 as shown is exemplary, and thus it is not necessary to limit the shape of the fluid supply pipe 12 as such. The fluid supply pipe 12 may also have a fluid control structure including a pump 12a for flowing a fluid and a control valve 12b for opening and closing a pipe to control inflow and outflow. For example, the pump 12a may include a metering pump capable of metering, and the control valve 12b may be configured by combining one or more various structures of various types such as a shutoff valve capable of controlling inflow and outflow, a check valve preventing reverse flow, a pressure regulating valve (PRV) capable of regulating pressure, and the like. In addition, an additional valve may be installed. The position of the valve may also be changed if necessary, such that the valve may be installed at a required position such as in a main pipe for introducing a fluid, a branch pipe branched to each of the injection nozzles 11, and the like.

The fluid supply part 13 supplies the pollutant treatment fluid in liquid phase to the injection nozzles 11 through the fluid supply pipe 12. The fluid supply part 13 may be a reservoir for storing the pollutant treatment fluid and may include a structure such as, for example, a fluid storage tank. The fluid supply part 13 may store the pollutant treatment fluid in liquid phase and supply the same to the fluid supply pipe 12. The pollutant treatment fluid may be a material capable of treating various pollutants (e.g., nitrogen oxides, sulfur oxides, and the like) in the exhaust gas. The material may also vary depending on the type of pollutant, and the material may be a single material or a mixture of one or more materials. By injecting the pollutant treatment fluid through the injection nozzles 11 protruding from the inner wall of the duct 3, the fluid can be more effectively brought into contact with the exhaust gas guided toward the inner wall of the duct 3.

The pollutant treatment fluid may be, for example, a liquid reducing agent for reducing nitrogen oxides in the exhaust gas, and in particular, reducing a causative substance of yellow gas such as nitrogen dioxide, which is generated during initial startup of the gas turbine 1 and may be contained in the exhaust gas. The pollutant treatment fluid may be, for example, a nitrogen-based reducing agent. The nitrogen-based reducing agent includes ammonia, urea, and the like, and may reduce nitrogen oxides on the surface of a catalyst. With such a nitrogen-based reducing agent and catalyst, it is possible to remove nitrogen oxides such as nitrogen dioxide by reducing them to nitrogen in a more stable and harmless form. However, the pollutant treatment fluid is not limited to the nitrogen-based reducing agent, and a non-nitrogen-based reducing agent may also be included. The non-nitrogen-based reducing agent may be, for example, at least one selected from hydrocarbons, oxygenated hydrocarbons, and carbohydrates including at least one hydroxyl (OH), ether, aldehyde, or ketone group in one molecule, and may be a liquid. A more preferred non-nitrogen-based reducing agent may be, for example, at least one selected from, ethanol, ethylene glycol, and glycerin, and may be a liquid.

The injection nozzles 11 are coupled to the duct 3 by passing therethrough as shown in FIG. 2. Each of the injection nozzles 11 may be configured such that one end thereof is located inside the duct 3 and the other end protrudes outside the duct 3. That is, as described above, the injection nozzles 11 can be installed in a very simple manner by passing through the duct 3 without the help of a structure that disturbs the exhaust gas flow in the duct 3. The fluid supply pipe 12 for supplying the pollutant treatment fluid may be connected to the other ends of the injection nozzles 11 protruding outside the duct 3.

The injection nozzles 11 can be installed very conveniently in a structure as shown in FIG. 3. For example, each of the injection nozzles 11 may be inserted into an inner side of a flange through pipe 114 passing through the duct 3 and having a flange formed at an end thereof outside the duct 3, and may be fixed with at least a part thereof in contact with the flange. For example, each of the injection nozzles 11 may be fixed in such a manner that a coupling flange 112 formed by protruding circumferentially from a body 111 of the injection nozzle 11 is brought into contact with the flange (a bent portion formed at the end of the flange through pipe 114 outside the duct 3 of FIG. 3) of the flange through pipe 114. Herein, instead of bring the coupling flange 112 and the flange of the flange through pipe 114 into direct contact with each other, a gasket 113 may be inserted therebetween to block a gap and to form a structure capable of buffering. Through this structure, the injection nozzle 11 can be inserted into the flange through pipe 114 to be fixed very conveniently as shown in FIG. 3A, and also can be withdrawn from the flange through pipe 114 to be separated very conveniently as shown in FIG. 3B. When fixing the injection nozzle 11, for example, a detachable coupling member (not shown) such as a bolt or a nut may be used. Also, a structure such as a protrusion and a groove formed to increase fixability is possible. With this structure, the injection nozzles 11 can be installed very conveniently at the duct 3.

The duct 3 may be configured as a polygonal duct in which different inner walls of a planar shape in which the injection nozzles 11 protrude are connected to each other to form a polygonal cross-section. However, the duct 3 is not necessarily limited as such, and may be formed in a shape having a circular cross-section. However, in the present embodiment, a case of a polygonal duct is described as an example, and in such a case, the following features may be additionally provided. However, since the present embodiment is only one example, the shape of the duct 3 in other embodiments may be changed to other shapes if necessary. The duct 3 may have a width larger than a maximum diameter of the outer cylinder 21 having a circular cross-section. For example, as shown in FIG. 2, the duct 3 may be configured as a square duct extended wider than the maximum diameter of the outer cylinder 21. At least one injection nozzle 11 may be disposed on each of a plurality of different inner walls of the duct 3. However, the shape of the duct 3 is not necessarily limited to the shape shown, and the arrangement of the injection nozzles 11 is not necessarily limited as shown. If necessary, the duct 3 may have a polygonal shape other than a quadrangle, and the arrangement of the injection nozzles 11 may be changed depending on the shape or arrangement of the duct 3. For example, the injection nozzles 11 may be appropriately changed in the number of nozzles installed on each of the different inner walls or in the distance between adjacent nozzles in consideration of flow rate distribution of the exhaust gas and the like.

As shown in FIG. 2, the injection nozzles 11 may be arranged in directions facing the hub 22 so as not to overlap with the hub 22. That is, as described above, the diffusion module part 2 includes the hub 22 inserted into the center of the outer cylinder 21, and the injection nozzles 11 may not intersect the extension line extending in the longitudinal direction of the hub 22 from the outer circumferential surface of the hub 22 (see FIG. 4). Hereinafter, an arrangement structure of the injection nozzles 11 will be described in more detail with reference to FIG. 4.

Referring to FIG. 4, the ends of the injection nozzles 11 may be spaced apart from the inner wall of the duct 3, along the perpendicular line a that extends to the inner wall of the duct 3 from the extension line extending parallel from the outer circumferential surface of the hub 22 in the longitudinal direction of the hub 22, by equal to or less than ⅝ of the length of the perpendicular line a. By setting positions of the ends of the injection nozzles 11 in this range, it is possible to more accurately position the ends of the injection nozzles 11 on the exhaust gas flow guided toward the inner wall of the duct 3, and thus it is possible to more effectively inject and mix the pollutant treatment fluid into the exhaust gas flow guided into the duct 3. This is also confirmed from experimental examples. As described above, the arrangement of the injection nozzles 11 is made within a limit not to intersect the extension line extending in the longitudinal direction of the hub 22 from the outer circumferential surface of the hub 22, and the positions of the ends of the injection nozzles 11 may be controlled appropriately within the above range.

Furthermore, the injection nozzles 11 may be spaced apart from the intersection point of the first extension line L1 that extends parallel to the longitudinal direction of the duct 3 from the inner wall of the duct 3 and the second extension line L2 that extends from the end of the hub 22 and intersects the first extension line L1 perpendicularly, along the first extension line L1, by equal to or less than ⅞ of the lineal distance c defined between the hub 22 and the duct expansion pipe 4 connected to the rear end of the duct 3. The positions of the injection nozzles 11 may be controlled appropriately within the above range within a limit located in the duct 3. That is, not only the positions of the ends of the injection nozzles 11, but also the installation positions of the entire nozzles may be controlled. Within the above range, it is possible to more effectively inject and mix the pollutant treatment fluid into the exhaust gas flow guided into the duct 3, which is also confirmed from experimental examples. The experimental examples will be described later in detail.

Hereinafter, an internal structure of the injection nozzles will be described in more detail with reference to FIGS. 5A, 5B, 6A, 6B, 7A, 7B, and 7C which are sectional views showing examples of the internal structure of the injection nozzle shown in FIG. 4. In each of the sectional views of FIGS. 5A to 7C, an end of each of the injection nozzles in which a fluid discharge port is formed is illustrated. In each of FIGS. 5A to 7C, a longitudinal sectional view of an example of the injection nozzle is disposed on the left side and a cross-sectional view thereof is disposed on the right side to facilitate confirmation of a flow path structure and the like.

Each of the injection nozzles 11 may have a flow path structure as shown in FIGS. 5A to 7C. The injection nozzle 11 may include a fluid transfer path IIa that is connected to a fluid discharge port 11d formed at an end of the injection nozzle and transfers a pollutant treatment fluid F, and a heat insulating flow path 11c accommodating a heat insulating fluid H therein and surrounding the fluid transfer path 11a without being connected to the fluid discharge port 11d. Therefore, the pollutant treatment fluid F can be discharged by being safely moved into the injection nozzle 11 by the thermal insulation effect of the heat insulating path 11c without being vaporized by high heat of the exhaust gas. Hereinafter, an example of such a flow path structure will be described in more detail.

Figure 5A:
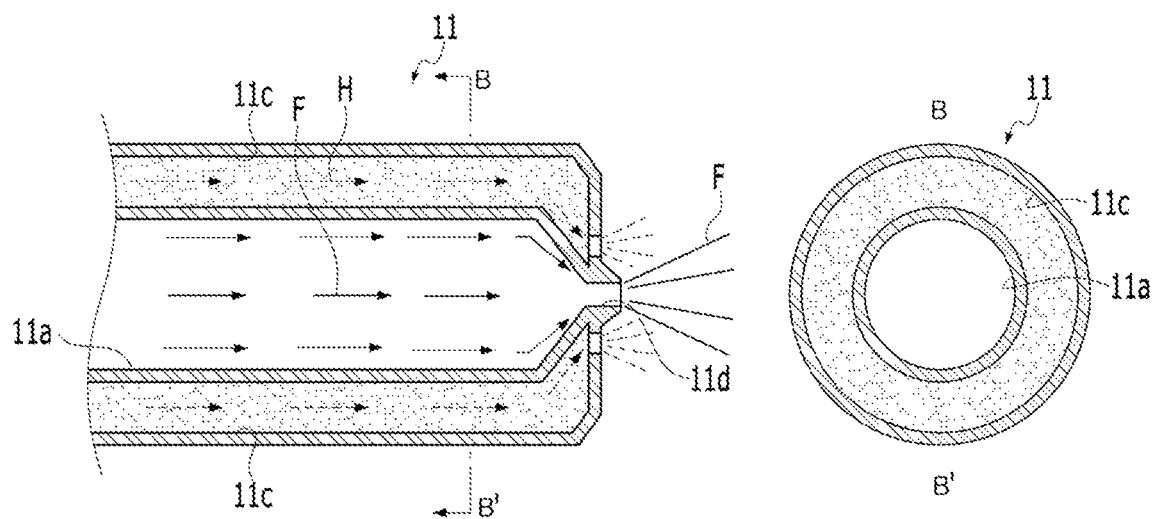
FIGS. 5A, 5B, 6A, 6B, 7A, 7B, and 7C are sectional views showing examples of the internal structure of the injection nozzle shown in FIG. 4.
Figure 5B:
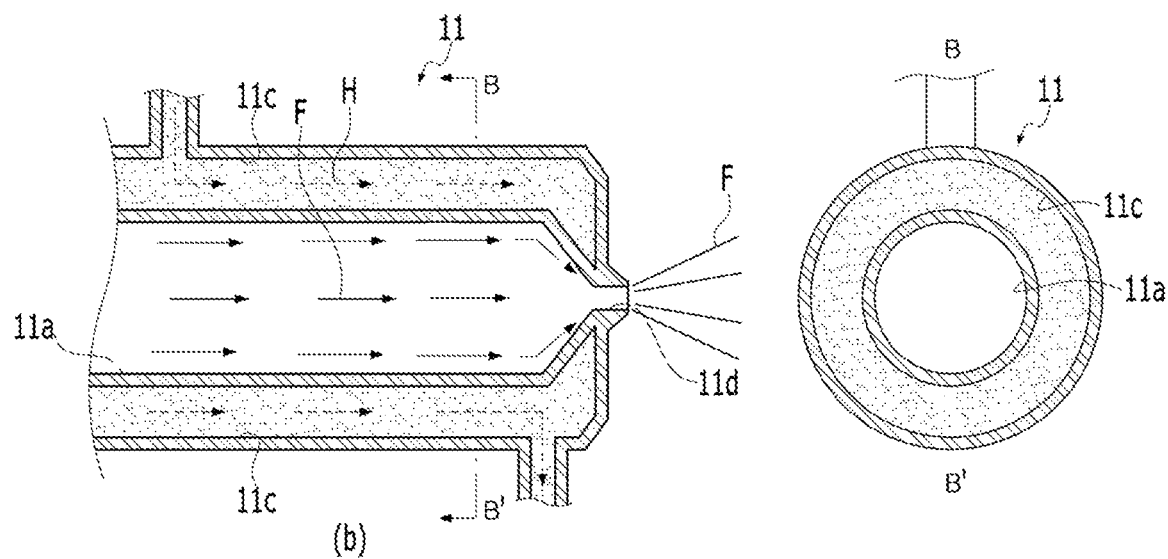

Each of the injection nozzles 11 may be configured, for example, as shown in FIGS. 5A and 5B. The injection nozzle 11 may include the fluid transfer path 11a for flowing the pollutant treatment fluid F, and the heat insulating flow path 11c for flowing the heat insulating fluid H and surrounding the fluid transfer path 11a, and the fluid discharge port 11d in communication with the fluid transfer path 11a may be formed at the end of the injection nozzle. The heat insulating fluid H may be a fluid to prevent evaporation of the pollutant treatment fluid. For example, as shown, the fluid transfer path 11a may be disposed centrally, and the heat insulating flow path 11c may be disposed circumferentially around the fluid transfer path 11a, such that the flow paths may form a concentric circle structure. With a multi-flow path structure, the injection nozzle 11 can protect the pollutant treatment fluid therein and block external high heat. Therefore, a problem such as evaporation of the pollutant treatment fluid inside the nozzle or the like can be effectively prevented. That is, the exhaust gas at the rear end of the diffusion module part directly connected to the gas turbine may have a relatively very high temperature, and thus by using such a nozzle structure, it is possible to effectively prevent a problem that the pollutant treatment fluid inside the nozzles may be evaporated due to heat of the exhaust gas even before being discharged.

Each of the injection nozzles 11 may be configured to have a structure in which an end of the heat insulating flow path 11c is open around the fluid discharge port 11d as shown in FIG. 5A, and may be configured to have a structure in which the heat insulating fluid H is circulated by being introduced and discharged through one side and the other side of the heat insulating flow path 11c as shown in FIG. 5B. The heat insulating fluid H may be a gas or a liquid. When the heat insulating fluid H is a gas, the structure of FIG. 5A may be more effective. That is, a gas such as air may be used as the heat insulating fluid H, and the gas may be discharged by being continuously passed through the heat insulating flow path 11c such that heat outside the heat insulating flow path can be effectively insulated so as not to reach therein. Furthermore, when the heat insulating fluid H is a liquid such as water, as shown in FIG. 5B, flow paths for introducing and discharging the heat insulating fluid H may be provided at one side and the other side of the heat insulating flow path 11c such that the heat insulating fluid H is circulated into the heat insulating flow path 11c and then discharged. In particular, with this structure, it is possible to effectively inject the pollutant treatment fluid in liquid phase through the injection nozzle 11, without utilizing a pressurized gas or the like which will be described later. However, the structure of the injection nozzle 11 according to the present invention is not necessarily limited as such, and thus other structures that may be applicable as required will be further described.

Figure 6A:
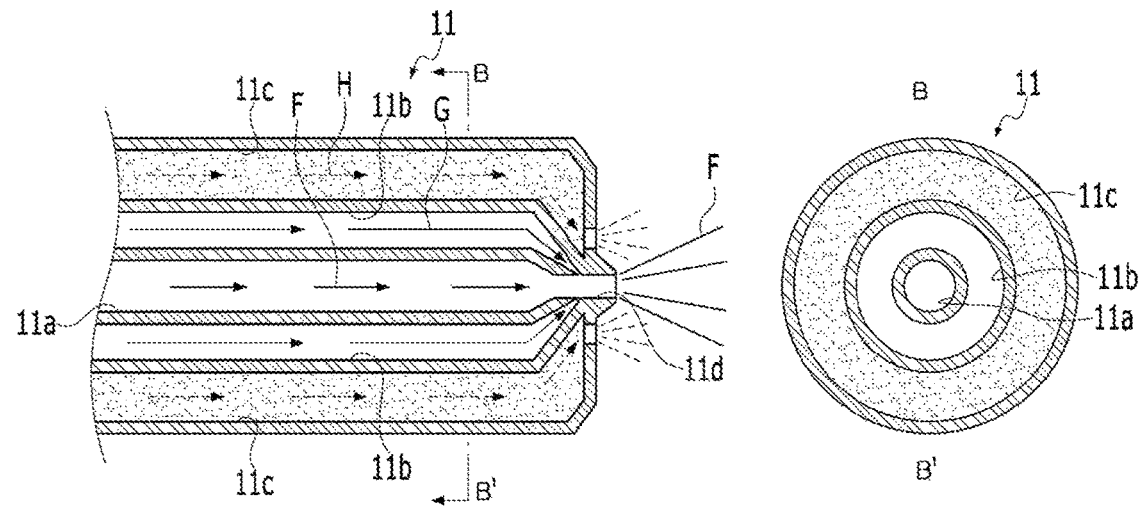
Figure 6B:
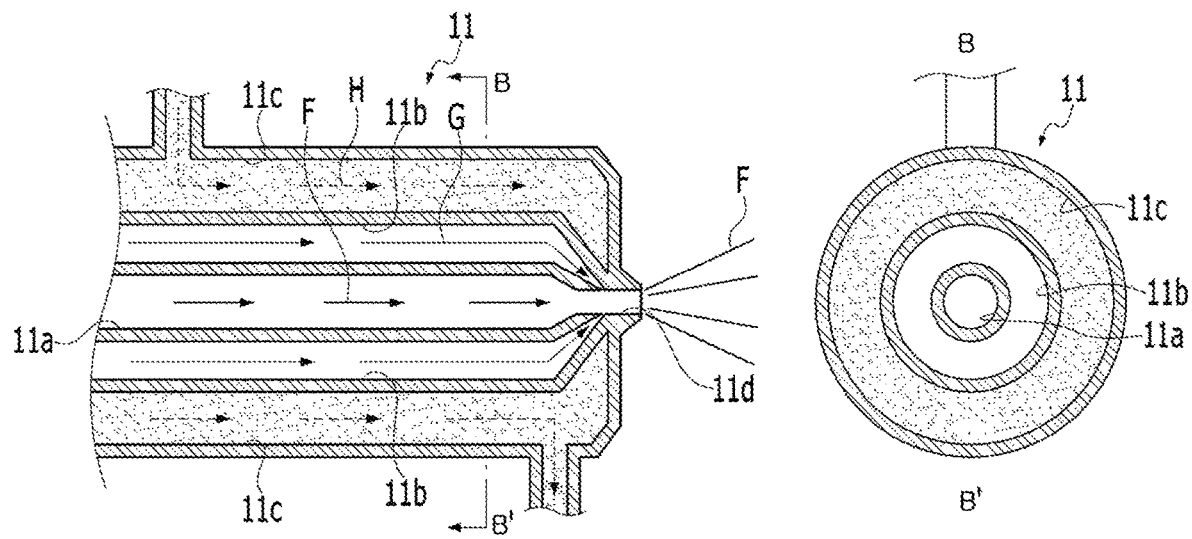

Meanwhile, as required, each of the injection nozzles 11 may further include a pressurized gas flow path 11b connected to the fluid discharge port 11d and transferring a pressurized gas G. In such a case, the pollutant treatment fluid to be injected may be formed as particulate bubbles. In this case, as shown in FIGS. 6A and B, each of the injection nozzles 11 may include the fluid transfer path 11a for flowing the pollutant treatment fluid F, the heat insulating flow path 11c for flowing the heat insulating fluid H and surrounding the fluid transfer path 11a, and the pressurized gas flow path 11b for flowing the pressurized gas G, and the fluid discharge port 11d in communication with the fluid transfer path 11a and the pressurized gas flow path 11b may be formed at the end of the injection nozzle. Preferably, the pressurized gas flow path 11b may be disposed between the fluid transfer path 11a and the heat insulating flow path 11c, and as shown, the pressurized gas flow path 11b may be disposed circumferentially around the outer surface of the fluid transfer path 11a. For example, as shown, the fluid transfer path 11a may be disposed centrally, and the pressurized gas flow path 11b and the heat insulating flow path 11c may be sequentially disposed circumferentially around the fluid transfer path 11a, such that the flow paths may form a concentric circle structure.

Although not shown, a compressor and a supply line connected to the compressor may be connected to the injection nozzle 11 to supply the pressurized gas G or the heat insulating fluid H thereto. The heat insulating fluid H may be, for example, air or water, and the pressurized gas G may be, for example, compressed air. The heat insulating fluid H may be a liquid or a gas. When the heat insulating fluid H is a gas, the above compressor may be utilized. When the heat insulating fluid H is a liquid, an additional circulation pump may be connected to the injection nozzles.

Figure 7A:
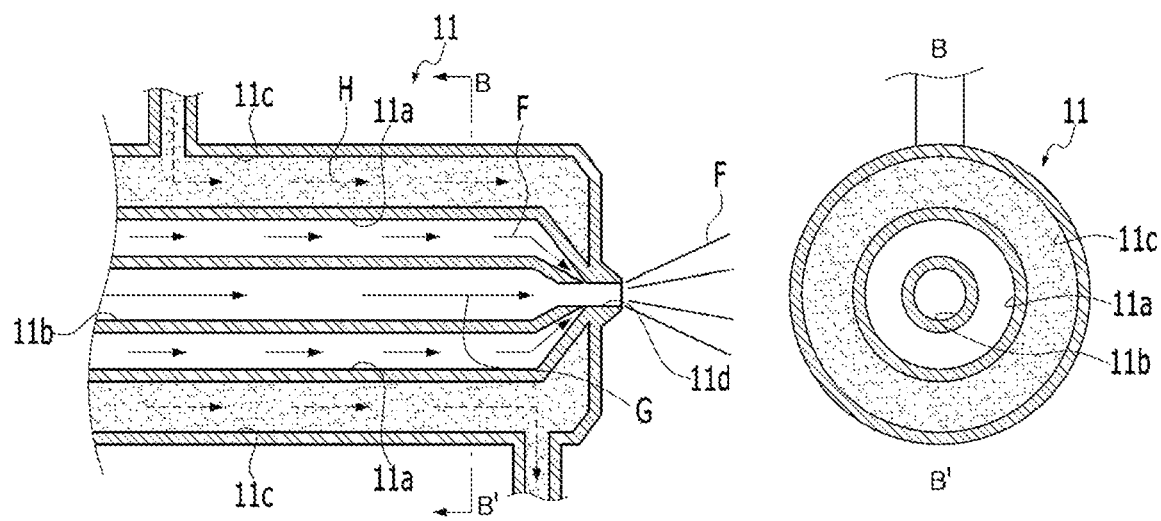
Figure 7B:
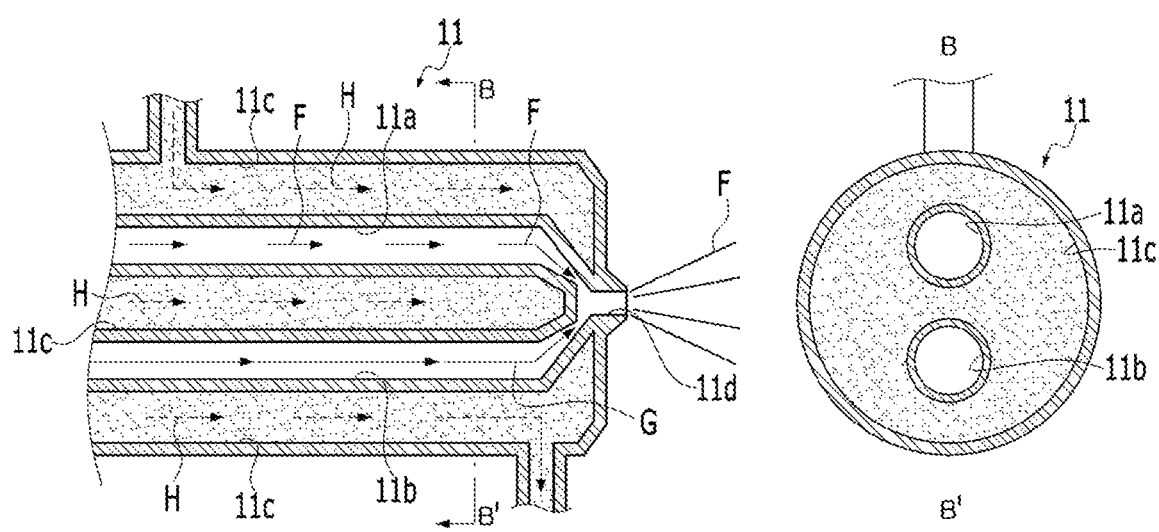
Figure 7C:
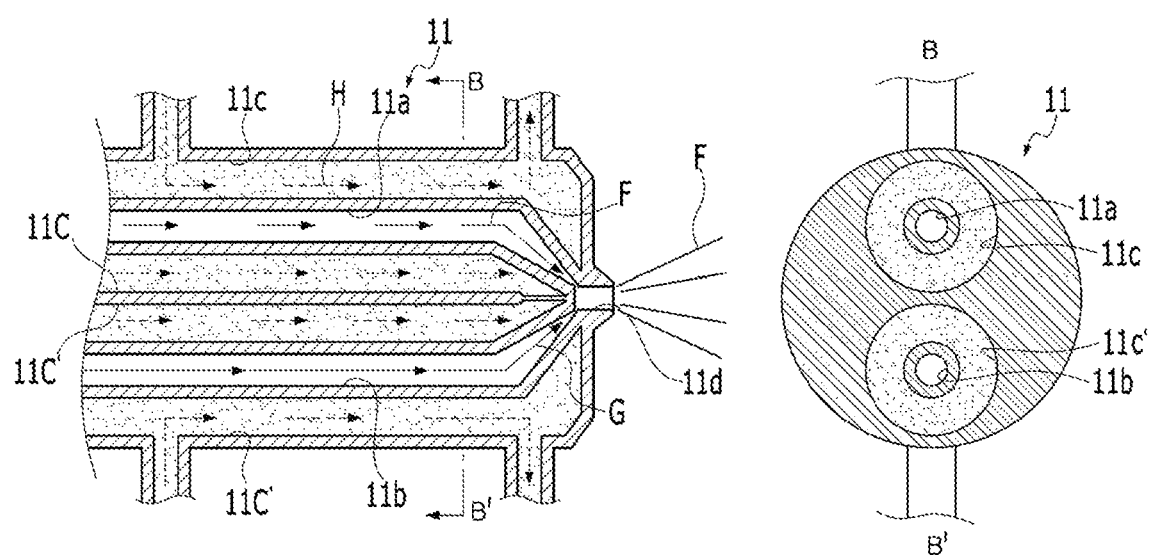

The arrangement or structure of the flow paths of each of the injection nozzles 11 may be changed into various shapes as shown in FIGS. 7A to 7C. For example, as shown in FIG. 7A, the fluid transfer path 11a may be disposed circumferentially around the outer surface of the pressurized gas flow path 11b. That is, the flow paths may be arranged in a concentric circle structure in which the pressurized gas flow path 11b is disposed centrally, the fluid transfer path 11a is disposed therearound, and the heat insulating flow path 11c surrounds the fluid transfer path 11a. Furthermore, as shown in FIGS. 7B and 7C, the flow paths may be arranged in a structure other than a concentric circle structure. In this case, for example, as shown in FIG. 7B, the pressurized gas flow path 11b may be spaced apart from the fluid transfer path 11a, and the heat insulating flow path 11c may also surround the pressurized gas flow path 11b. That is, the heat insulating flow path 11c may not be limited to a specific shape, but the inner space of the injection nozzle 11 may be widely used to form a heat insulating flow path 11c having a shape that entirely surrounds both the fluid transfer path 11a and the pressurized gas flow path 11b which are spaced apart from each other. Furthermore, for example, as shown in FIG. 7C, the pressurized gas flow path 11b may be spaced apart from the fluid transfer path 11a, and an additional insulating flow path 11c' surrounding the pressurized gas flow path 11b may be provided. That is, by using the inner space of the injection nozzle 11, the heat insulating flow path 11c and the additional heat insulating flow path 11c' circumferentially surrounding the outer surfaces of the fluid transfer path 11a and the pressurized gas flow path 11b, respectively, may be formed. Herein, a structure for allowing the heat insulating fluid H to be introduced into and discharged therefrom for circulation may be formed in each of the heat insulating flow path 11c and the additional heat insulating flow path 11c'. As described above, by forming various nozzle structures in which the pollutant treatment fluid F, the pressurized gas G, the heat insulating fluid H flow, and by using the heat insulating fluid H in the nozzles, it is possible to block external high temperature heat. Through this, it is also possible to effectively prevent a problem that the pollutant treatment fluid may be evaporated inside the nozzle.

As shown in FIG. 1, the catalyst module 7 is disposed at the rear ends of the injection nozzles 11. As described above, since the injection nozzles 11 are applied in combination with the diffusion module part 2, the pollutant treatment fluid can be brought into contact with pollutants more efficiently, and the pollutants can be more easily treated by catalysis on the surface of the catalyst included in the catalyst module 7. The catalyst module 7 may include a housing and the catalyst located inside the housing. The catalyst may have a shape through which the exhaust gas can pass, such as in a honeycomb shape. The catalyst included in the catalyst module 7 may be, for example, a selective catalytic reduction catalyst, more specifically, a zeolite-based selective catalytic reduction catalyst. The zeolite-based selective catalytic reduction catalyst mainly includes a zeolite catalyst ion-exchanged with metals (e.g., Fe, Cu, Mn, and Ce) among catalysts used in an ammonia-selective catalytic reduction (SCR) reaction, and may be a catalyst commercially available or produced by a known method such as ion exchange method, dry impregnation method, or the like. The zeolite-based selective catalytic reduction catalyst is more preferable in that the zeolite-based selective catalytic reduction catalyst is applicable to a variety of operating conditions and locations due to a wide application temperature range thereof. In the case of a metal oxide selective catalytic reduction catalyst including vanadium, which has been used to treat nitrogen oxides in a conventional thermal power plant, there is a problem of deterioration of the catalyst at a high temperature, and the position at which the catalyst can be placed was limited to a position spaced a considerable distance from a gas turbine. Even in such a position, there was no problem in maintaining the temperature required for catalysis in a state in which the gas turbine was operated stably (e.g., a full load (or base load) operating state with 100% gas turbine output). However, during initial startup of the gas turbine, it was difficult to maintain the temperature required for catalysis at such a position. In practice, while the metal oxide selective catalytic reduction catalyst is difficult to apply to a front end of the heat exchange module, the zeolite-based selective catalytic reduction catalyst has a relatively low deterioration potential at high temperature and thus can also be applied to the front end of the heat exchange module where a high temperature region is generated under normal operating conditions. Furthermore, during initial startup of the gas turbine, the overall exhaust gas temperature is not relatively high and the temperature change is severe. However, even in such a case, the zeolite-based selective catalytic reduction catalyst can perform catalysis at the front end of the heat exchange module having a relatively high temperature, thereby effectively removing nitrogen oxides. The zeolite-based selective catalytic reduction catalyst is not limited thereto, but may be, for example, at least one selected from an iron-zeolite-based selective catalytic reduction catalyst and a copper-zeolite-based selective catalytic reduction catalyst. The iron-zeolite-based selective catalytic reduction catalyst has an application temperature range of 200 to 650 degrees Celsius, and can remove equal to or greater than 80% of nitrogen oxides at 400 to 650 degrees Celsius. The copper-zeolite-based selective catalytic reduction catalyst has an application temperature range of 200 to 500 degrees Celsius, and can remove equal to or greater than 80% of nitrogen oxides at 250 to 450 degrees Celsius and thus is preferable in that the copper-zeolite-based selective catalytic reduction catalyst is applicable in a low temperature range. In addition, by using both the iron-zeolite-based selective catalytic reduction catalyst and the copper-zeolite-based selective catalytic reduction catalyst, effective denitrification is possible over a wider temperature range (e.g., 200 to 650 degrees Celsius). As such, when applying two or more catalysts, the respective catalysts may be applied together or separately. When applied separately, each of the catalysts may be arranged to be included in each layer across the exhaust gas flow. Furthermore, in view of deterioration of the catalyst due to high temperature, the zeolite-based selective catalytic reduction catalyst is preferable as compared to the metal oxide selective catalytic reduction catalyst. Therefore, the zeolite-based selective catalytic reduction catalyst is applicable to the front end of the heat exchange module 8 unlike the metal oxide selective catalytic reduction catalyst.

Accordingly, as shown in FIG. 1, the catalyst module 7 may be installed at the front end of the heat exchange module 8, and may be disposed at various positions such as the rear end of the heat exchange module to effectively remove pollutants such as nitrogen oxides. Preferably, the catalyst module 7 may be disposed between the injection nozzles 11 and an exhaust gas discharge side end of the heat exchange module 8. The exhaust gas discharge side end of the heat exchange module 8 refers to an end of the heat exchange module facing a direction from which the exhaust gas passes through the heat exchange module 8 and away from the heat exchange module. Referring to FIG. 1, the exhaust gas discharge side end refers to a right end of the fourth heat exchange module 87. FIG. 1 shows that the catalyst module 7 is disposed between the injection nozzles 11 and the first heat exchange module 81, but is not limited thereto. The catalyst module 7 may be disposed at various positions, such as between the first heat exchange module 81 and the second heat exchange module 83. On the basis of the temperature, the catalyst module 7 may be disposed at a position where the exhaust gas temperature is preferably equal to or less than 650 degrees Celsius, more preferably 200 to 650 degrees Celsius. This is because the efficiency of treating nitrogen oxides may decrease when the exhaust gas temperature is greater than 650 degrees Celsius, and the efficiency of treating nitrogen oxides may also decrease when the exhaust gas temperature is less than 200 degrees Celsius. Therefore, it is preferable that the catalyst module is disposed at a position other than a position where the exhaust gas temperature is greater than 650 degrees Celsius according to gas turbine operating conditions. More preferably, the catalyst module 7 may be disposed between the injection nozzles 11 and the second heat exchange module 83 at a position other than the position where the exhaust gas temperature is greater than 650 degrees Celsius and other than a position where the exhaust gas temperature does not reach 200 degrees Celsius. An example in which the catalyst module 7 is disposed between the first heat exchange module 81 and the second heat exchange module 83 will be described in more detail in one modification which will be described later. Furthermore, the position where the catalyst module 7 is disposed may be controlled according to operating conditions. For example, the catalyst module 7 may be disposed at a position where the exhaust gas temperature reaches within 10 minutes after the startup of the gas turbine, preferably 200 to 650 degrees Celsius, more preferably 200 to 600 degrees Celsius.

Figure 8:
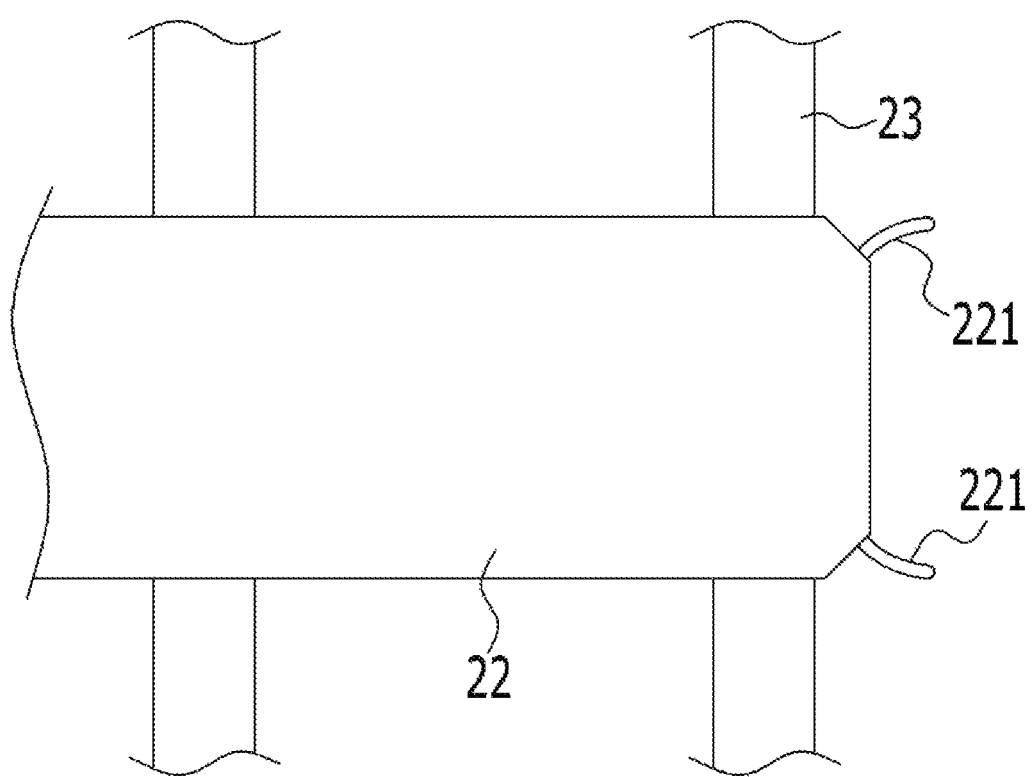
FIG. 8 is a view showing an example of the flow control member provided at the hub.

Hereinafter, a flow control member that can be provided at the hub will be described in more detail with reference to FIG. 8. FIG. 8 is a view showing an example of the flow control member provided at the hub.

As shown in FIG. 8, the hub 22 described above may include the flow control member 221. That is, the flow control member 221 for guiding the flow direction of the exhaust gas toward the inner wall of the duct 3 may be further provided at the hub 22. The flow control member 221 may be formed to guide the flow of the exhaust gas so as to enhance the centrifugal velocity component at the rear end, and may be implemented in various shapes. For example, the flow control member 221 may be implemented as a curved plate, or a block-shaped structure in which a fluid guide surface is formed on an outer surface thereof. Therefore, the shown flow control member 221 is only one example and is not necessarily limited as such. The size, arrangement, and shape of the flow control member 221 may be appropriately changed in consideration of the flow of the exhaust gas and the like.

Figure 9:
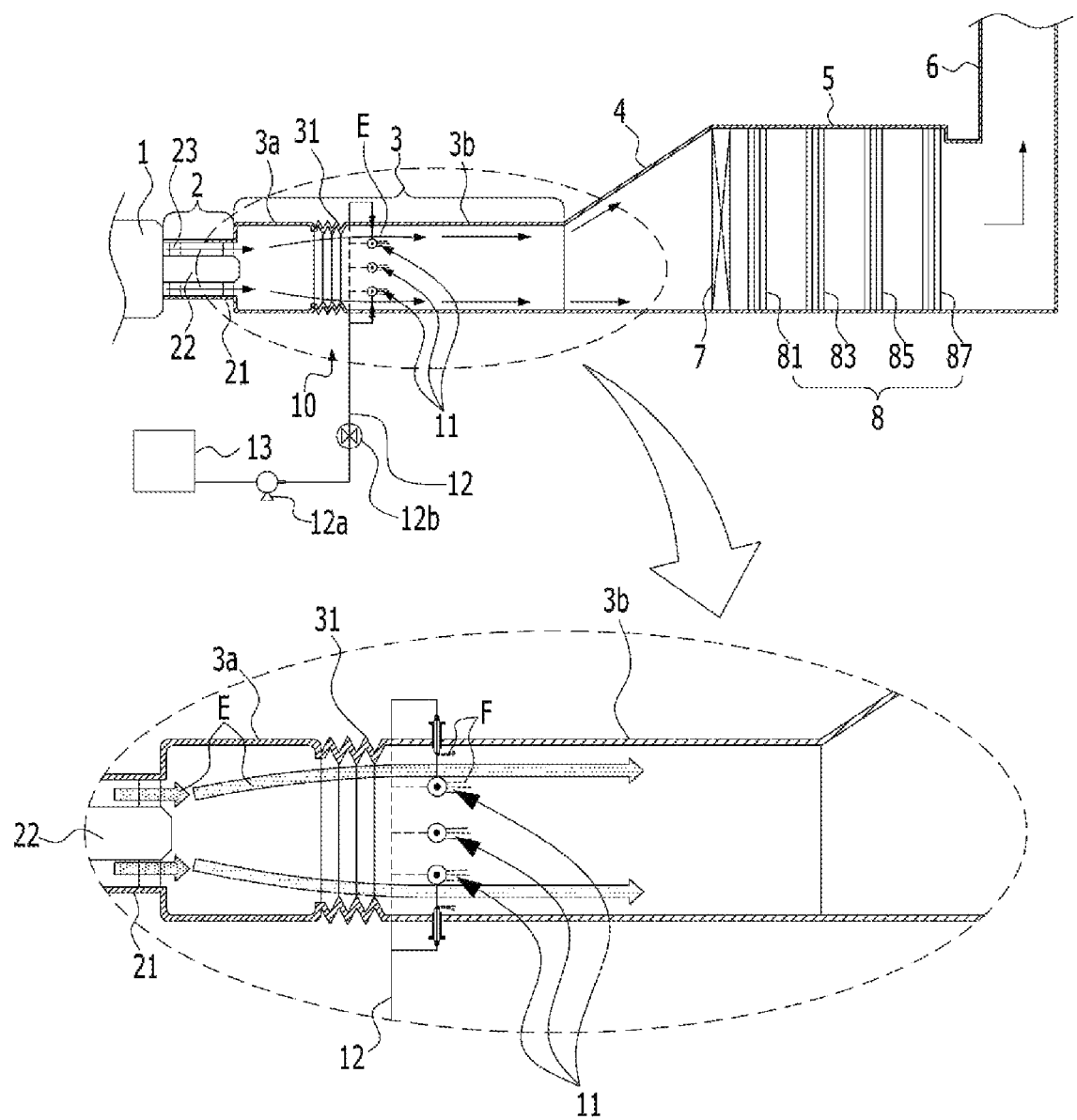
FIG. 9 is an operation view showing the apparatus for treating exhaust gas of FIG. 1.

Hereinafter, an operation process of the apparatus for treating exhaust gas will be described with reference to FIG. 9. FIG. 9 is an operation view showing the apparatus for treating exhaust gas of FIG. 1.

The apparatus 10 for treating exhaust gas according to the present invention is operated as shown in FIG. 9. When the gas turbine 1 is driven, the exhaust gas E is discharged. The exhaust gas E then passes through the diffusion module part 2 located at the rear end of the gas turbine 1, under flow control. In other words, as described above, while passing through the diffusion module part 2, the exhaust gas E obtains centrifugal velocity and is guided toward the inner wall of the duct 3 located at the rear end of the diffusion module part 2. In particular, the hub 22 inserted in the center of the diffusion module part 2 may create a radial flow toward the outer cylinder 21 to more effectively guide the flow of the exhaust gas E toward the inner wall of the duct 3.

While the gas turbine 1 is driven, the exhaust gas E is continuously guided toward the inner wall of the duct 3 through such a process, whereby an exhaust gas flow of high concentration is formed along the inner wall of the duct 3. The pollutant treatment fluid F is intensively injected into the exhaust gas E guided toward the inner wall of the duct 3, through the injection nozzles 11 protruding from the inner wall of the duct 3. The pollutant treatment fluid F is stored in the fluid supply part 13 in liquid phase, and is supplied to each of the injection nozzles 11 through the fluid supply pipe 12 and discharged to the end of the injection nozzle 11 to be injected immediately into the exhaust gas E. In particular, since the pollutant treatment fluid F in liquid phase is intensively injected into the flow of the exhaust gas E of high velocity and high concentration that is continuously guided toward the inner wall of the duct 3, a mixing rate of the pollutant treatment fluid F and the exhaust gas E can be greatly increased. In addition, even when the pollutant treatment fluid F does not undergo a separate evaporation process, the exhaust gas E and the pollutant treatment fluid F reach the catalyst module 7 in a sufficiently mixed state, whereby pollutants can be treated more effectively on the catalyst surface by catalysis.

The apparatus for treating exhaust gas according to the present invention is not limited to the embodiment of the present invention, and may be variously modified. A first modification 10-1 and a second modification 10-2 of the embodiment of the present invention will be described in detail with reference to FIGS. 10 and 11.

Figure 10:
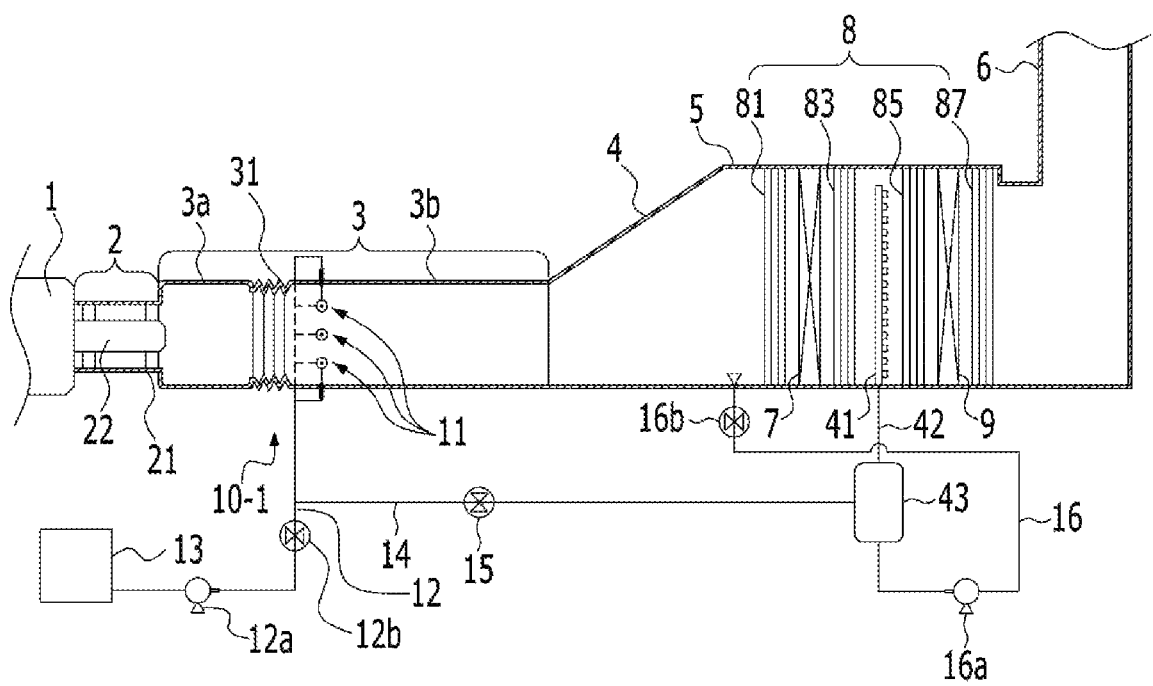
FIG. 10 is a view showing an arrangement structure of a first modification of the apparatus for treating exhaust gas of FIG. 1.

FIG. 10 is a view showing an arrangement structure of the first modification of the apparatus for treating exhaust gas of FIG. 1. The following description will focus on parts that differ from the above-described embodiment such that the description is concise and clear, and descriptions of components that are not described separately will be replaced with the above descriptions.

Referring to FIG. 10, an apparatus 10-1 for treating exhaust gas, which is the first modification of the embodiment, further includes an additional catalyst module 9 in addition to a catalyst module 7. With this structure, it is also possible to further treat pollutants by catalysis in the additional catalyst module 9 by using a surplus pollutant treatment fluid that remains without being sufficiently reacted in the catalyst module 7. For example, the catalyst module 7 may include a zeolite-based selective catalytic reduction catalyst and the additional catalyst module 9 may include a metal oxide selective catalytic reduction catalyst, whereby nitrogen oxides can be treated more effectively by a selective catalytic reduction reaction using a pollutant treatment fluid such as ammonia or urea. That is, nitrogen oxides not treated in the catalyst module 7 can be treated in the additional catalyst module 9, and it is possible to treat nitrogen oxides more effectively in response to various operating conditions because different catalyst characteristics are applied to the catalyst module 7 and the additional catalyst module 9. The metal oxide selective catalytic reduction catalyst may be, for example, a metal oxide catalyst including vanadium among ammonia-SCR reaction catalysts, and may be a catalyst commercially available or produced by a known method. A preferred application temperature range of the metal oxide selective catalytic reduction catalyst may be 200 to 450 degrees Celsius.

Furthermore, the additional catalyst module 9 may also include an oxidation catalyst for treating substances that can be treated by an oxidation method or a decomposition method, such as hydrocarbons such as aldehydes, an incomplete combustion by-product such as carbon monoxide, and an unreacted reducing agent such as unreacted ammonia. In other words, carbon monoxide or the like generated due to incomplete combustion during initial startup of a gas turbine can also be treated by the oxidation method or the decomposition method by applying the oxidation catalyst. The oxidation catalyst is not limited as long as being a catalyst that is applicable to a material which can be treated by the oxidation method or the decomposition method, and may be, for example, an oxidation catalyst including platinum, and/or palladium. The oxidation catalyst may also be a catalyst commercially available or produced by a known method.

Therefore, the additional catalyst module 9 may include at least one selected from the metal oxide selective catalytic reduction catalyst and the oxidation catalyst, such that pollutants can be treated more effectively. When applying different types of catalysts together, each catalyst may be disposed to cross the flow direction of the exhaust gas to form a different layer.

As long as the additional catalyst module 9 is disposed at a rear end of the catalyst module 7, the position thereof is not limited. However, as shown in FIG. 10, the additional catalyst module 9 may be disposed at a rear end of a second heat exchange module 83. In more detail, the catalyst module 7 may be disposed between a first heat exchange module 81 and the second heat exchange module 83, and the additional catalyst module 9 may be disposed at a rear end of a third heat exchange module 85 between the third heat exchange module 85 and a fourth heat exchange module 87. A gas-phase fluid injection part 41 may be disposed between the second heat exchange module 83 and the third heat exchange module 85 to inject a pollutant treatment fluid in gas phase.

A catalyst included in the additional catalyst module 9 may have a lower application temperature upper limit than a catalyst included in the catalyst module 7. As such, by disposing the additional catalyst module 9 including the catalyst having a lower application temperature upper limit than the catalyst module 7 at the rear end of the catalyst module 7, a catalyst having a risk of deterioration can also be easily applied. In addition, the pollutants contained in the exhaust gas of which the temperature is lowered due to heat exchange or the like can be treated more efficiently. For example, on the basis of the temperature, the additional catalyst module 9 may be disposed at a position where the exhaust gas temperature is preferably equal to or less than 450 degrees Celsius, more preferably 200 to 450 degrees Celsius. This is because the efficiency of treating nitrogen oxides may be decreased due to deterioration when the exhaust gas temperature is greater than 450 degrees Celsius, and the efficiency of treating nitrogen oxides may also be decreased when the exhaust gas temperature is less than 200 degrees Celsius. Therefore, it is preferable that the additional catalyst module 9 is disposed at a position other than a position where the exhaust gas temperature is greater than 450 degrees Celsius according to gas turbine operating conditions. More preferably, the additional catalyst module 9 may be disposed between the second heat exchange module 83 and an outlet of a stack 6 at a position other than the position where the exhaust gas temperature is greater than 450 degrees Celsius and other than a position where the exhaust gas temperature does not reach 200 degrees Celsius. Furthermore, the position where the additional catalyst module 9 is disposed may be controlled according to operating conditions. For example, the additional catalyst module 9 may be disposed at a position where the exhaust gas temperature is preferably 200 to 450 degrees Celsius under a gas turbine base load condition.

Herein, the catalyst module 7 may be disposed at the position described in the above embodiment and, as shown, may also be disposed between the first heat exchange module 81 and the second heat exchange module 83.

Furthermore, the gas-phase fluid injection part 41 may be disposed at a front end of the additional catalyst module 9. The gas-phase fluid injection part 41 can directly inject the pollutant treatment fluid in gas phase, which is more dispersible than a pollutant treatment fluid in liquid phase, into the exhaust gas, thereby enabling the pollutant treatment fluid in gas phase to be easily brought into contact with pollutants in a wider area. The gas-phase fluid injection part 41 may be disposed at a rear end of injection nozzles 11 to inject the pollutant treatment fluid in gas phase into the flowing exhaust gas. The pollutant treatment fluid in gas phase may be, for example, a nitrogen-based reducing agent and/or a non-nitrogen-based reducing agent when an object to be treated requires a reduction reaction for treatment, such as nitrogen oxides. The gas-phase fluid injection part 41 may supply the pollutant treatment fluid in gas phase into the flowing exhaust gas, and may include a nozzle, a grid, and the like generally applied to inject the pollutant treatment fluid in gas phase. The pollutant treatment fluid in gas phase may be previously mixed with the exhaust gas and vaporized. That is, the gas-phase fluid injection part 41 may be connected to a vaporizer 43 for vaporizing the pollutant treatment fluid in liquid phase. The vaporizer 43 may be located outside an exhaust gas flow path, and may vaporize the exhaust gas flowing between the gas turbine 1 and the outlet of the stack 6 by mixing the flowing exhaust gas with the pollutant treatment fluid in liquid phase. A mixed gas of a reducing agent vaporized by being mixed with the exhaust gas in the vaporizer 43 and the exhaust gas is supplied to the gas-phase fluid injection part 41. Through this structure, the exhaust gas can be recycled to vaporize the pollutant treatment fluid in liquid phase in the vaporizer 43 without provision of an additional heat source, and a mixed gas of the vaporized pollutant treatment fluid and the exhaust gas can be provided to the gas-phase fluid injection part 41, whereby nitrogen oxides and the like in the entire exhaust gas can be treated more effectively. In detail, the pollutant treatment fluid in liquid phase may be introduced from the fluid supply part 13 to the vaporizer 43 through a branch pipe 14 branched from the fluid supply pipe 12, the pollutant treatment fluid in liquid phase may be vaporized by the exhaust gas transferred to the vaporizer 43 through an exhaust gas transfer pipe 16, and the vaporized pollutant treatment fluid in gas phase may be supplied to the gas-phase fluid injection part 41 through a gas-phase fluid supply pipe 42. The exhaust gas transfer pipe 16 may be provided with a control valve 16b and a pump 16a to control the flow of the exhaust gas. The branch pipe 14 may also be provided with a control valve 15 to control the flow of the pollutant treatment fluid in liquid phase introduced into the vaporizer 43. FIG. 10 shows an example in which one fluid supply part 13 is used, but is not limited thereto. The fluid supply part 13 and an additional fluid supply part (not shown) may be connected to the vaporizer 43. In particular, when the pollutant treatment fluid in liquid phase supplied to the injection nozzles 11 and the pollutant treatment fluid in gas phase supplied to the gas-phase fluid injection part 41 include different materials from each other, it is preferable that in addition to the fluid supply part, the additional fluid supply part is connected directly to the vaporizer with a connection pipe.

Figure 11:
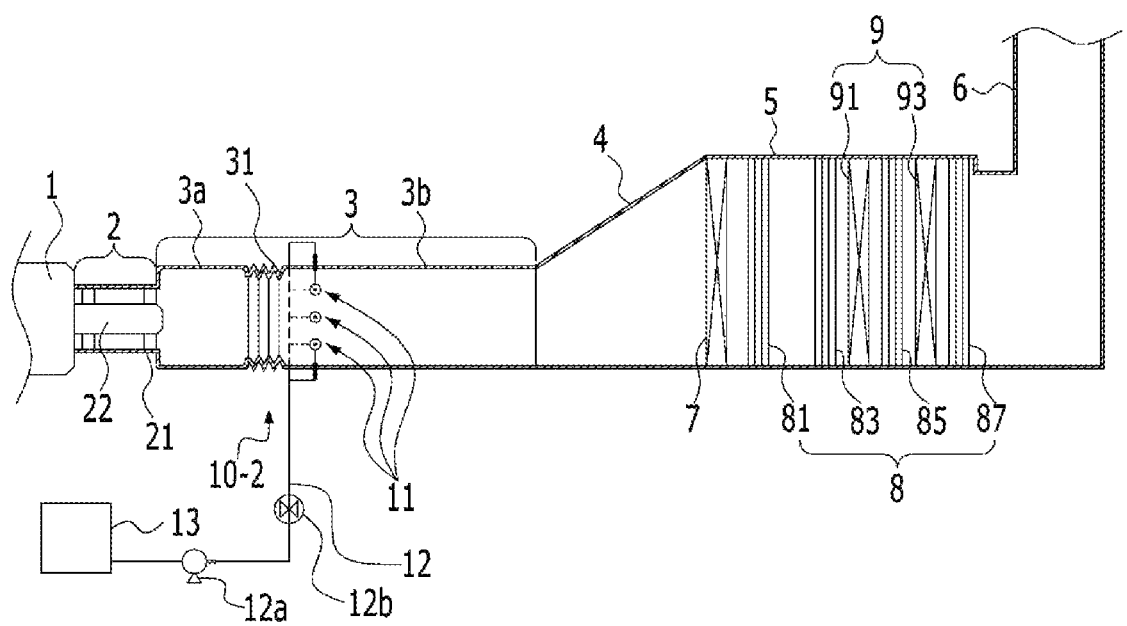
FIG. 11 is a view showing an arrangement structure of a second modification of the apparatus for treating exhaust gas of FIG. 1.

FIG. 11 is a view showing an arrangement structure of the second modification of the apparatus for treating exhaust gas of FIG. 1. The following description will focus on parts that differ from the above-described embodiment such that the description is concise and clear, and descriptions of components that are not described separately will be replaced with the above descriptions.

Referring to FIG. 11, an apparatus 10-2 for treating exhaust gas, which is the second modification of the embodiment, further includes an additional catalyst module 9 in addition to a catalyst module 7. The additional catalyst module 9 includes a first additional catalyst module 91 and a second additional catalyst module 93. The respective first and second additional catalyst modules 91 and 93 may include the same or different types of catalysts. When the same type of catalyst is included, the same as the first modification described above, but a reaction area of a catalyst included in the additional catalyst module is widened, thereby increasing the amount and speed of the exhaust gas to be treated. Furthermore, when different types of catalysts are included in the respective first and second additional catalyst modules 91 and 93, various materials may be treated by catalysis of each catalyst. For example, when the first additional catalyst module 91 includes a metal oxide selective catalytic reduction catalyst and the second additional catalyst module 93 includes a metal oxide catalyst, the first additional catalyst module 91 can treat pollutants with higher efficiency by catalysis by using a surplus pollutant treatment fluid that remains without being sufficiently reacted in the catalyst module 7. Also, the second additional catalyst module 93 can treat pollutants such as carbon monoxide which can be treated by an oxidation method.

As long as the additional catalyst module 9 is disposed at a rear end of the catalyst module 7, the position thereof is not limited. However, as shown in FIG. 11, the first additional catalyst module 91 is disposed at a rear end of a second heat exchange module 83, and the second additional catalyst module 93 may be disposed at a rear end of the first additional catalyst module 91. In more detail, the catalyst module 7 may be disposed between injection nozzles 11 and a first heat exchange module 81, the first additional catalyst module 91 is disposed between the second heat exchange module 83 and a third heat exchange module, and the second additional catalyst module 93 may be disposed between the third heat exchange module 85 and a fourth heat exchange module 87. Furthermore, also in the second modification, a gas-phase fluid injection part may be disposed at a front end of the additional catalyst module 9.

Hereinafter, effects of the present invention will be described in more detail through several experimental examples. Hereinafter, when describing each experimental example, the above-mentioned components will be described by referring to them without separate reference numerals.

EXPERIMENTAL EXAMPLE 1

Exhaust Gas Treatment Experiment

An apparatus for treating exhaust gas was installed in a reduced model of a combined cycle power plant in a form shown in FIG. 11, and an exhaust gas treatment experiment was performed by injecting a liquid reducing agent (ammonia) in the same molar ratio as nitrogen oxides using injection nozzles. Herein, a catalyst of a catalyst module was a zeolite-based selective catalytic reduction catalyst (a catalyst formed by wash coating Fe-beta zeolite (Zeolyst) on a honeycomb support) was used. A catalyst of a first additional catalyst module was a vanadium-based selective catalytic reduction catalyst mainly composed of $V_2O_5$, and a catalyst of a second additional catalyst module was a platinum catalyst which is an oxidation catalyst. Herein, positions of the injection nozzles in a duct are located at positions corresponding to ⅜ of the above-described lineal distance c from a hub, and positions of ends of the injection nozzles are located at positions corresponding to ⅙ of the above-described perpendicular line a from an inner wall of the duct. Under conditions simulating changes in gas turbine output of the combined cycle power plant, nitrogen oxides (NOx: nitrogen oxides containing NO and $NO_2$) concentration and carbon monoxide concentration before and after injection of the reducing agent were measured in a stack. Furthermore, the nitrogen oxides concentration and the ammonia concentration after injection of the reducing agent were measured between the catalyst module and a first heat exchange module and in the stack, and the carbon monoxide concentration after injection of the reducing agent was measured in the stack. The carbon monoxide concentration was measured as an indicator of incomplete combustion by-products such as unburned hydrocarbons such as aldehydes, in addition to carbon monoxide. Results of measurement are shown in Table 1. In Table 1, 100% of gas turbine output represents a state in which a gas turbine is operated at full load.

As shown in Table 1, the NOx concentration at a rear end of the catalyst module after injection of the reducing agent was 3 to 5 ppm regardless of operating time. At such nitrogen oxides concentration, yellow gas does not appear at all. Therefore, it can be seen that the present invention can effectively treat yellow gas and the like, which may be particularly problematic in the combined cycle power plant. In particular, it can be seen that even during initial startup where the gas turbine output is low, it is possible to treat all nitrogen oxides including causative substances of yellow gas. It can also be seen that pollutants can be easily treated by the present invention even under operating conditions where the temperature is relatively low during initial startup of the gas turbine and thus pollutant treatment is difficult. This is believed to be because a reaction took place on the catalyst surface in a state in which a pollutant treatment fluid in the duct is efficiently mixed with an object to be treated by the present invention. Furthermore, it was shown that the exhaust gas finally discharged to the stack does not contain nitrogen oxides as well as substances such as a surplus reducing agent or incomplete combustion by-products, or contains the same only in extremely trace amounts. This is believed to be because of a combined action of the catalyst module and the additional catalyst module. As a result, it can be seen that the exhaust gas of the thermal power plant can be treated very effectively and efficiently by the present invention.

Hereinafter, effects on mixing and effects on exhaust gas treatment thereby will be examined by confirming changes in distribution of the pollutant treatment fluid according to changes in positions of the injection nozzles in the duct and positions of ends of the injection nozzles.

TABLE 1

Changes in concentration of measured substance before and after injection of reducing agent using injection nozzles

| | | | | | | | |
|---|---|---|---|---|---|---|---|
| Gas turbine output (%) | 5 | 10 | 20 | 40 | 60 | 80 | 100 |
| Stack NOx concentration before injection of reducing agent (ppm) | 20 | 48 | 53 | 58 | 55 | 34 | 26 |
| Stack CO concentration before injection of reducing agent (ppm) | 10 | 30 | 120 | 400 | 500 | 20 | Not detected |
| Catalyst module rear end NOx concentration after injection of reducing agent (ppm) | 5 | 3 | 3 | 4 | 4 | 4 | 3 |
| Catalyst module rear end $NH_3$ concentration after injection of reducing agent (ppm) | 1 | 3 | 3 | 2 | 3 | 3 | 1 |
| Stack NOx concentration after injection of reducing agent (ppm) | Not detected | Not detected | Not detected | 1 | 1 | Not detected | Not detected |
| Stack $NH_3$ concentration after injection of reducing agent (ppm) | Not detected | Not detected | Not detected | Not detected | Not detected | Not detected | Not detected |
| Stack CO concentration after injection of reducing agent (ppm) | Not detected | Not detected | Not detected | 1 | Not detected | Not detected | Not detected |

EXPERIMENTAL EXAMPLE 2

Confirmation of Changes in Distribution of Pollutant Treatment Fluid at Rear End of Duct According to Changes in Positions of Injection Nozzles in Duct The following experiment was carried out to confirm changes in mixing distribution of a pollutant treatment fluid according to changes in positions of injection nozzles in a duct. Ammonia water was injected through the injection nozzles inside the duct as shown in FIGS. 1 to 4, and concentration distribution of ammonia was measured in a duct expansion pipe connected to a rear end of the duct. Herein, air which simulates the condition of the fluid discharged from a gas turbine during startup of the gas turbine was injected at the position of the gas turbine. The injection nozzles were arranged on cross section of the duct in a form as shown in FIG. 2, but the experiment was carried out by increasing a spaced distance from a hub along the longitudinal direction of the duct at a constant ratio with respect to the above-described lineal distance c of FIG. 4. The positions of the ends of the injection nozzles were maintained at ⅗ position of the above-described perpendicular line a from an inner wall of the duct. A hole accessible inside the duct was formed at an end of the duct expansion pipe (a point where the duct expansion pipe and a heat recovery boiler part are connected to each other), and a detection device was inserted through the hole to measure ammonia concentration at a total of nine points, three points at the upper side, three points at the central side, and three points at the lower side of the end of the duct expansion pipe. From results of measurement, as shown in Table 2 below, an average concentration at the three points at the upper side and a standard deviation thereof, an average concentration at the three points at the central side and a standard deviation thereof, an average concentration at the three points at the lower side and a standard deviation thereof, and a total average concentration at all the nine points and a standard deviation thereof were calculated. The ammonia water injected through the injection nozzles was controlled such that ammonia concentration was 9±1 ppm as a theoretical value in a measuring part. As a result, results shown in Table 2 were obtained.

As shown in Table 2, it was confirmed that when the positions of the injection nozzles in the duct were located at a position exceeding ⅞ with respect to the lineal distance c from the hub, the standard deviation of the total average concentration was increased greatly. Therefore, in such a case, it appears that there is a fear that the pollutant treatment fluid may not be uniformly mixed in the exhaust gas. This can be interpreted as being caused by a significant difference between the average concentration at the lower side, the average concentration at the central side, and the average concentration at the upper side. Therefore, it can be seen that the positions of the injection nozzles in the duct are more preferably within ⅞ of the lineal distance c from the hub. In particular, a uniform mixing of the pollutant treatment fluid and the exhaust gas inevitably affects exhaust gas treatment by catalysis. Therefore, by positioning the injection nozzles in the duct within ⅞ of the lineal distance c from the hub, it will also lead to a uniform mixing of the exhaust gas and the pollutant treatment fluid and a more stable treatment of the exhaust gas.

EXPERIMENTAL EXAMPLE 3

Confirmation of Changes in Distribution of Pollutant Treatment Fluid at Rear End of Duct According to Changes in Positions of Ends of Injection Nozzles The following experiment was carried out to confirm changes in distribution of a pollutant treatment fluid according to changes in positions of ends of injection nozzles. In detail, the experiment was carried out by changing several conditions among the conditions of experimental example 2 in such a manner that positions of the injection nozzles in a duct is fixed at ⅗ position with respect to the lineal distance c from a hub and the positions of the ends of the injection nozzles were changed at a constant ratio with respect to the perpendicular line a. Ammonia water injected through the injection nozzles was controlled such that ammonia concentration was 10±1 ppm as a theoretical value in a measuring part, and the other experimental conditions were maintained the same. From this, results as shown in Table 3 were obtained.

TABLE 2

Changes in distribution of pollutant treatment fluid at rear end of duct according to changes in positions of injection nozzles in duct (concentration unit: ppm)

| Positions of injection nozzles in duct (ratio to lineal distance c) | Total average concentration | Total standard deviation | Lower side average concentration | Lower side standard deviation | Central side average concentration | Central side standard deviation | Upper side average concentration | Upper side standard deviation |
|---|---|---|---|---|---|---|---|---|
| 1/8 | 9.0 | 0.9 | 9.0 | 0.8 | 9.2 | 1.0 | 8.9 | 0.7 |
| 2/8 | 9.1 | 1.0 | 9.0 | 0.8 | 9.1 | 1.2 | 9.1 | 0.8 |
| 3/8 | 8.9 | 1.0 | 8.9 | 0.9 | 8.9 | 1.2 | 8.9 | 0.9 |
| 4/8 | 9.0 | 1.1 | 9.0 | 1.1 | 8.9 | 1.3 | 9.0 | 1.0 |
| 5/8 | 9.0 | 1.3 | 9.0 | 1.3 | 9.0 | 1.5 | 9.0 | 1.2 |
| 6/8 | 9.1 | 1.5 | 9.1 | 1.5 | 8.9 | 1.5 | 9.2 | 1.5 |
| 7/8 | 9.0 | 1.7 | 9.2 | 1.7 | 8.8 | 1.7 | 9.2 | 1.7 |
| 8/8 | 9.3 | 3.5 | 9.3 | 3.1 | 9.8 | 4.1 | 8.9 | 3.0 |

TABLE 3

Changes in distribution of pollutant treatment fluid at rear end of duct according to changes in positions of ends of injection nozzles (concentration unit: ppm)

| Positions of injection nozzles in duct (ratio to perpendicular line a) | Total average concentration | Total standard deviation | Lower side average concentration | Lower side standard deviation | Central side average concentration | Central side standard deviation | Upper side average concentration | Upper side standard deviation |
|---|---|---|---|---|---|---|---|---|
| 1/6 | 10.1 | 0.9 | 10.0 | 0.7 | 10.2 | 1.0 | 10.0 | 0.8 |
| 2/6 | 10.2 | 0.9 | 10.2 | 0.8 | 10.1 | 1.1 | 10.1 | 0.9 |
| 3/6 | 10.1 | 1.1 | 10.1 | 1.0 | 10.1 | 1.2 | 10.0 | 1.0 |
| 4/6 | 10.1 | 1.2 | 10.0 | 1.1 | 10.2 | 1.4 | 10.1 | 1.1 |
| 5/6 | 10.2 | 1.4 | 10.1 | 1.2 | 10.2 | 1.6 | 10.3 | 1.5 |
| 6/6 | 10.8 | 3.5 | 10.7 | 3.0 | 10.9 | 4.2 | 10.8 | 3.1 |

As shown in Table 3, it was confirmed that when the positions of the ends of the injection nozzles were located at a position exceeding 5/6 with respect to the perpendicular line a from an inner wall of the duct, the standard deviation of the total average concentration was increased greatly. Therefore, in such a case, it appears that there is a fear that the pollutant treatment fluid may not be uniformly mixed in the exhaust gas. This can be interpreted as being caused by a significant difference between the average concentration at the lower side, the average concentration at the central side, and the average concentration at the upper side. Therefore, it can be seen that the positions of the ends of the injection nozzles are more preferably within 5/6 of the perpendicular line a from the inner wall of the duct. In particular, a uniform mixing of the pollutant treatment fluid and the exhaust gas inevitably affects exhaust gas treatment by catalysis. Therefore, by positioning the ends of the injection nozzles within 5/6 of the perpendicular line a from the inner wall of the duct, it will also lead to a uniform mixing of the exhaust gas and the pollutant treatment fluid and a more stable treatment of the exhaust gas.

Summarizing the results of experimental examples 2 and 3, it can be seen that exhaust gas treatment will be more effective when the positions of the injection nozzles in the duct are within 7/8 of the lineal distance c from the hub and the positions of the ends of the injection nozzles are within 5/6 of the perpendicular line a from the inner wall of the duct.

Although embodiments of the invention have been described hereinabove with reference to the accompanying drawings, it should be understood that those who are ordinarily skilled in the art will appreciate that various alternatives, modifications, and equivalents are possible, without changing the spirit or essential features of the present invention. Therefore, preferred embodiments of the present invention have been described for illustrative purposes, and should not be construed as being restrictive.

What is claimed is:

1. An apparatus for treating exhaust gas of a thermal power plant, the apparatus comprising:
   a diffusion module part controlling an exhaust gas flow between a duct disposed at a rear end of a gas turbine of the thermal power plant and the gas turbine to guide the exhaust gas flow toward an inner wall of the duct;
   a plurality of injection nozzles installed in a flow section in the duct in which the exhaust gas guided toward the inner wall of the duct from the diffusion module part flows, and protruding from the inner wall of the duct;
   a fluid supply pipe connected to the plurality of injection nozzles and extending outside the duct;
   a fluid supply part supplying a pollutant treatment fluid in a liquid phase to the plurality of injection nozzles through the fluid supply pipe; and
   a catalyst module disposed at rear ends of the plurality of injection nozzles,
   wherein the diffusion module part includes an outer cylinder through which the exhaust gas passes, and a hub inserted into a center of the outer cylinder and guiding the exhaust gas in a centrifugal direction, and
   the plurality of injection nozzles do not intersect an extension line extending from an outer circumferential surface of the hub in a longitudinal direction of the hub.

2. The apparatus of claim 1, further comprising:
   a flow control member provided at the hub, and guiding a flow direction of the exhaust gas toward the inner wall of the duct.

3. The apparatus of claim 1, wherein ends of the plurality of injection nozzles are spaced apart from the inner wall of the duct, along a perpendicular line that extends to the inner wall of the duct from the extension line extending parallel from the outer circumferential surface of the hub in the longitudinal direction of the hub, by equal to or less than 5/6 of a length of the perpendicular line.

4. The apparatus of claim 1, wherein the plurality of injection nozzles are spaced apart from an intersection point of a first extension line that extends parallel to the longitudinal direction of the duct from the inner wall of the duct and a second extension line that extends from an end of the hub and intersects the first extension line perpendicularly, along the first extension line, by equal to or less than 7/8 of a lineal distance defined between the hub and a duct expansion pipe connected to a rear end of the duct.

5. The apparatus of claim 1, wherein the catalyst module includes a selective catalytic reduction catalyst.

6. The apparatus of claim 5, wherein the selective catalytic reduction catalyst includes a zeolite-based selective catalytic reduction catalyst.

7. The apparatus of claim 6, wherein the zeolite-based selective catalytic reduction catalyst includes at least one selected from an iron-zeolite-based selective catalytic reduction catalyst and a copper-zeolite-based selective catalytic reduction catalyst.

8. The apparatus of claim 1, further comprising:
   a heat exchange module disposed at the rear ends of the plurality of injection nozzles, wherein the catalyst module is disposed between the plurality of injection nozzles and an exhaust gas discharge side end of the heat exchange module.

9. The apparatus of claim 8, wherein the heat exchange module includes a first heat exchange module and a second heat exchange module, wherein the first heat exchange module is disposed between the plurality of injection nozzles and the second heat exchange module, and the catalyst module is disposed between the first and second heat exchange modules or between the plurality of injection nozzles and the first heat exchange module.

10. The apparatus of claim 1, further comprising:
an additional catalyst module disposed at a rear end of the catalyst module.

11. The apparatus of claim 10, wherein the additional catalyst module includes at least one selected from a metal oxide selective catalytic reduction catalyst and an oxidation catalyst.

12. The apparatus of claim 10, further comprising:
a heat exchange module disposed at the rear ends of the plurality of injection nozzles, wherein the heat exchange module includes a first heat exchange module and a second heat exchange module, the first heat exchange module is disposed between the plurality of injection nozzles and the second heat exchange module, the catalyst module is disposed between the first and second heat exchange modules or between the plurality of injection nozzles and the first heat exchange module, and the additional catalyst module is disposed at a rear end of the second heat exchange module.

13. The apparatus of claim 12, wherein the heat exchange module further includes a third heat exchange module disposed at the rear end of the second heat exchange module, and
the additional catalyst module is disposed at a rear end of the third heat exchange module.

14. The apparatus of claim 13, wherein a gas-phase fluid injection part injecting a pollutant treatment fluid in a gas phase is disposed between the second and third heat exchange modules.

15. The apparatus of claim 10, wherein the additional catalyst module includes a first additional catalyst module including a metal oxide selective catalytic reduction catalyst and a second additional catalyst module including an oxidation catalyst, and
the second additional catalyst module is disposed at a rear end of the first additional catalyst module.

* * * * *